US011855686B2

(12) United States Patent
Yoon et al.

(10) Patent No.: US 11,855,686 B2
(45) Date of Patent: Dec. 26, 2023

(54) ELECTRONIC DEVICE FOR RECEIVING TIME DIFFERENCE OF ARRIVAL MESSAGES AND METHOD FOR OPERATING THE SAME

(71) Applicant: Samsung Electronics Co., Ltd., Gyeonggi-do (KR)

(72) Inventors: Sejong Yoon, Gyeonggi-do (KR); Moonseok Kang, Gyeonggi-do (KR); Hyunchul Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 17/565,617

(22) Filed: Dec. 30, 2021

(65) Prior Publication Data

US 2022/0385333 A1 Dec. 1, 2022

Related U.S. Application Data

(63) Continuation of application No. PCT/KR2021/016409, filed on Nov. 11, 2021.

(30) Foreign Application Priority Data

Jun. 1, 2021 (KR) .......................... 10-2021-0071157

(51) Int. Cl.
*H04B 1/7163* (2011.01)
*H04W 52/02* (2009.01)

(52) U.S. Cl.
CPC .... *H04B 1/71637* (2013.01); *H04W 52/0225* (2013.01)

(58) Field of Classification Search
CPC .............. H04B 1/7163; H04B 1/71637; H04B 2201/71634; H04W 52/0225; Y02D 30/70
See application file for complete search history.

(56) References Cited

U.S. PATENT DOCUMENTS

| 10,652,925 B2 | 5/2020 | Naguib et al. |
| 2005/0192031 A1 | 9/2005 | Vare |

(Continued)

FOREIGN PATENT DOCUMENTS

| KR | 10-2006-0019007 A | 3/2006 |
| KR | 10-2013-0040939 A | 4/2013 |

(Continued)

OTHER PUBLICATIONS

International Search Report dated Aug. 12, 2022.
International Search Report dated Feb. 21, 2022.
3rd Generation Partnership Project dated Mar. 17, 2021.

*Primary Examiner* — David S Huang
(74) *Attorney, Agent, or Firm* — Cha & Reiter, LLC

(57) ABSTRACT

According to certain embodiments, an electronic device comprises: a wireless communication module configured to support ultra-wide band (UWB) communication; and at least one processor operatively connected with the wireless communication module, wherein the at least one processor is configured to: set the wireless communication module to a wake-up state; when a given number of first ranging response messages (RRMs) are received from second external electronic devices after receiving a first ranging initiation message (RIM) from a first external electronic device in a RIM slot of a first ranging round, set the wireless communication module to a sleep state after receiving a first ranging final message (RFM) from the first external electronic device in a RFM slot of the first ranging round until a RIM slot of a second ranging round is reached after the first ranging round; set the wireless communication module to the wake-up state in the RIM slot in the second ranging round; and set the wireless communication module to the (Continued)

sleep state if a second RIM is not received from a third external electronic device in the RIM slot in the second ranging round.

15 Claims, 17 Drawing Sheets

(56) References Cited

U.S. PATENT DOCUMENTS

| | | |
|---|---|---|
| 2008/0080640 A1 | 4/2008 | Rofougaran |
| 2010/0002612 A1 | 1/2010 | Hsu et al. |
| 2011/0292819 A1 | 12/2011 | Ekbal et al. |
| 2015/0168536 A1 | 6/2015 | Banin et al. |
| 2019/0007093 A1 | 1/2019 | Hammerschmidt et al. |
| 2020/0106877 A1 | 4/2020 | Ledvina et al. |
| 2020/0137676 A1 | 4/2020 | Yoon et al. |
| 2020/0366335 A1 | 11/2020 | Lee et al. |
| 2021/0014844 A1 | 1/2021 | Lee et al. |
| 2021/0076163 A1 | 3/2021 | Burowski et al. |
| 2021/0105736 A1 | 4/2021 | Tancerel et al. |

FOREIGN PATENT DOCUMENTS

| | | |
|---|---|---|
| KR | 10-2018-0026737 A | 3/2018 |
| KR | 10-2018-0135947 A | 12/2018 |
| KR | 10-2019-0004240 A | 1/2019 |
| KR | 10-2019-0007206 A | 1/2019 |
| KR | 10-2055085 B1 | 12/2019 |
| KR | 10-2020-0035205 A | 4/2020 |
| KR | 10-2021-0007831 A | 1/2021 |
| WO | 2017/196584 A1 | 11/2017 |
| WO | 2020/116969 A1 | 6/2020 |
| WO | 2020/230993 A1 | 11/2020 |
| WO | 2021/085825 A1 | 5/2021 |

Downlink TDOA message (702)

MAC header (MHR) (710)

| Octets : 2 | 2 |
|---|---|
| Frame Control (722) | Source Address (724) |
| MAC header (726) ||

Payload (712)

| Parameter | Size (bits) | Notes |
|---|---|---|
| Vendor OUI | 24 | 0x5A18FF = FiRa OUI |
| UWB Message ID | 4 | 0x08 = Downlink TDoA Message |
| Reserved | 4 | Reserved for future use |
| Message Control | 16 | Configuration of the message |
| Block Index | 16 | Block index of the current ranging block |
| Round Index | 16 | Round index of the current ranging round |
| TX Timestamp | 64 | Transmission timestamp (in units of 15.65 ps) in the common time base of the controller |
| Ranging Device Management List (732) | 0/24*N | N number of Ranging Device Management List Elements |
| CFO | 0/32 | Clock frequency offset with respect to Initiator (in the unit of ppm) |
| First Round-Trip Time | 0/32 | N/A |
| Reply Time List | 0/48*M | M number of Reply Time List Elements |

FIG. 7C

Ranging device management list (732)

| Parameter | Size (bits) | Notes |
| --- | --- | --- |
| Ranging Role | 1 | 0: Responder, 1: Initiator |
| Ranging Slot Index | 8 | Assigned slot |
| Address | 16 | Address of responder |
| Scheduled UWB Message | 4 | ID of UWB message which will be conveyed in the slot |
| Stop Ranging | 1 | 0: Ranging will be continued<br>1: Ranging will be stopped |
| Reserved | 2 | Reserved for future use |

FIG.7D

ELECTRONIC DEVICE FOR RECEIVING TIME DIFFERENCE OF ARRIVAL MESSAGES AND METHOD FOR OPERATING THE SAME

CROSS-REFERENCE TO RELATED APPLICATION(S)

This application is a continuation application, claiming priority under § 365(c), of an International application No. PCT/KR2021/016409, filed on Nov. 11, 2021, which is based on and claims the benefit of a Korean patent application number 10-2021-0071157, filed on Jun. 1, 2021, in the Korean Intellectual Property Office, the disclosure of each of which is incorporated by reference herein in its entirety.

Additionally, this application is related to Korean Patent Application No. 10-2021-0070751, filed on Jun. 1, 2021 in the Korean Intellectual Property Office , the disclosure of which is incorporated by reference herein in its entirety.

TECHNICAL FIELD

Certain embodiments of the disclosure relate to an electronic device for receiving time difference of arrival (TDOA) messages and a method for operating the same.

BACKGROUND ART

Ultra-wide band (UWB) is a wireless technology developed to transmit data at a high data rate using very low power consumption in a very short range. UWB short-range radio technology may be used to complement other long-range radio technologies, such as Wi-Fi or WiMAX and cellular broadband communications. UWB has been developed to deliver accurate, reliable and efficient short-range communication as compared to Bluetooth.

UWB radio technology makes it possible to locate objects indoors and outdoors with an accuracy of, e.g., less than 30 cm. To enhance localization accuracy, UWB may use time difference of arrival (TDOA) and two-way ranging, which may be referred to as TDOA ranging.

During a TDOA ranging procedure, an electronic device needs to remain in a wake-up state. The electronic device needs to remain in the wake up state to monitor whether downlink TDOA messages are received anchor devices. This increases power consumption. Electronic device, which are typically mobile devices rely on batteries for operation. It is therefore important to preserve power. Therefore, a need exists for techniques for reducing power consumption for TDOA ranging in electronic devices supporting UWB wireless technology.

According to certain embodiments, an electronic device comprises: a wireless communication module configured to support ultra-wide band (UWB) communication; and at least one processor operatively connected with the wireless communication module, wherein the at least one processor is configured to: set the wireless communication module to a wake-up state; when a given number of first ranging response messages (RRMs) are received from second external electronic devices after receiving a first ranging initiation message (RIM) from a first external electronic device in a RIM slot of a first ranging round, set the wireless communication module to a sleep state after receiving a first ranging final message (RFM) from the first external electronic device in a RFM slot of the first ranging round until a RIM slot of a second ranging round is reached after the first ranging round; set the wireless communication module to the wake-up state in the RIM slot in the second ranging round; and set the wireless communication module to the sleep state if a second RIM is not received from a third external electronic device in the RIM slot in the second ranging round.

According to another embodiment, an electronic device comprises: a wireless communication module configured to support ultra-wide band (UWB) communication; and at least one processor operatively connected with the wireless communication module, wherein the at least one processor is configured to: set the wireless communication module to a wake-up state; receive, through the wireless communication module, a first ranging initiation message (RIM), at least two first ranging response messages (RRMs) responsive to the first RIM, and a first ranging final message (RFM) in each of a given number of first ranging rounds; select at least one second ranging round for waking up the wireless communication module based on information for anchor devices that have transmitted the first RIM, the first RRMs, and the first RFM in the first ranging rounds; set the wireless communication module to a sleep state until before a RIM slot of the selected second ranging round is reached in response to selecting; set the wireless communication module to the wake-up state in the RIM slot in the selected second ranging round; and determine, through the wireless communication module, whether a second RIM, at least two second RRMs, and a second RFM are received in the selected second ranging round.

According to certain embodiments, a method performed by an electronic device including a wireless communication module supporting ultra-wide band (UWB) communication, the method comprises: setting the wireless communication module to a wake-up state; when a given number of first ranging response messages (RRMs) are received from second external electronic devices after a first ranging initiation message (RIM) from a first external electronic device in a RIM slot of the first ranging round, setting the wireless communication module to a sleep state after receiving a first ranging final message (RFM) from the first external electronic device in a RFM slot of the first ranging round until a RIM slot of a second ranging round is reached after the first ranging round.

According to certain embodiments, a method performed by an electronic device including a wireless communication module supporting ultra-wide band (UWB) communication, comprises: setting the wireless communication module to a wake-up state; receiving, through the wireless communication module, a first ranging initiation message (RIM), at least two first ranging response messages (RRMs) responsive to the first RIM, and a first ranging final message (RFM) in each of a given number of first ranging rounds; selecting a second ranging round for waking up the wireless communication module based on information for anchor devices that have transmitted the first RIM, the first RRMs, and the first RFM in the first ranging rounds; setting the wireless communication module to a sleep state until before a RIM slot in the selected second ranging round is reached in response to selecting; setting the wireless communication module to the wake-up state in the RIM slot in the selected second ranging round; and determining, through the wireless communication module, whether a second RIM, at least two second RRMs, and a second RFM are received in the selected ranging round.

According to certain embodiments, power consumption may be reduced in an electronic device by providing an electronic device that receives TDOA messages and a method for operating the same.

DESCRIPTION OF THE DRAWINGS

FIGS. 7A, 7B, 7C, and 7D (hereinafter, collectively referred to as FIG. 7) are views for describing a format of a downlink TDOA message 702 used in certain embodiments of the disclosure;

DETAILED DESCRIPTION

Certain embodiments include an electronic device 101 may conduct TDOA ranging with UWB wireless technology in a power efficient manner.

Electronic Device

Figure 1:
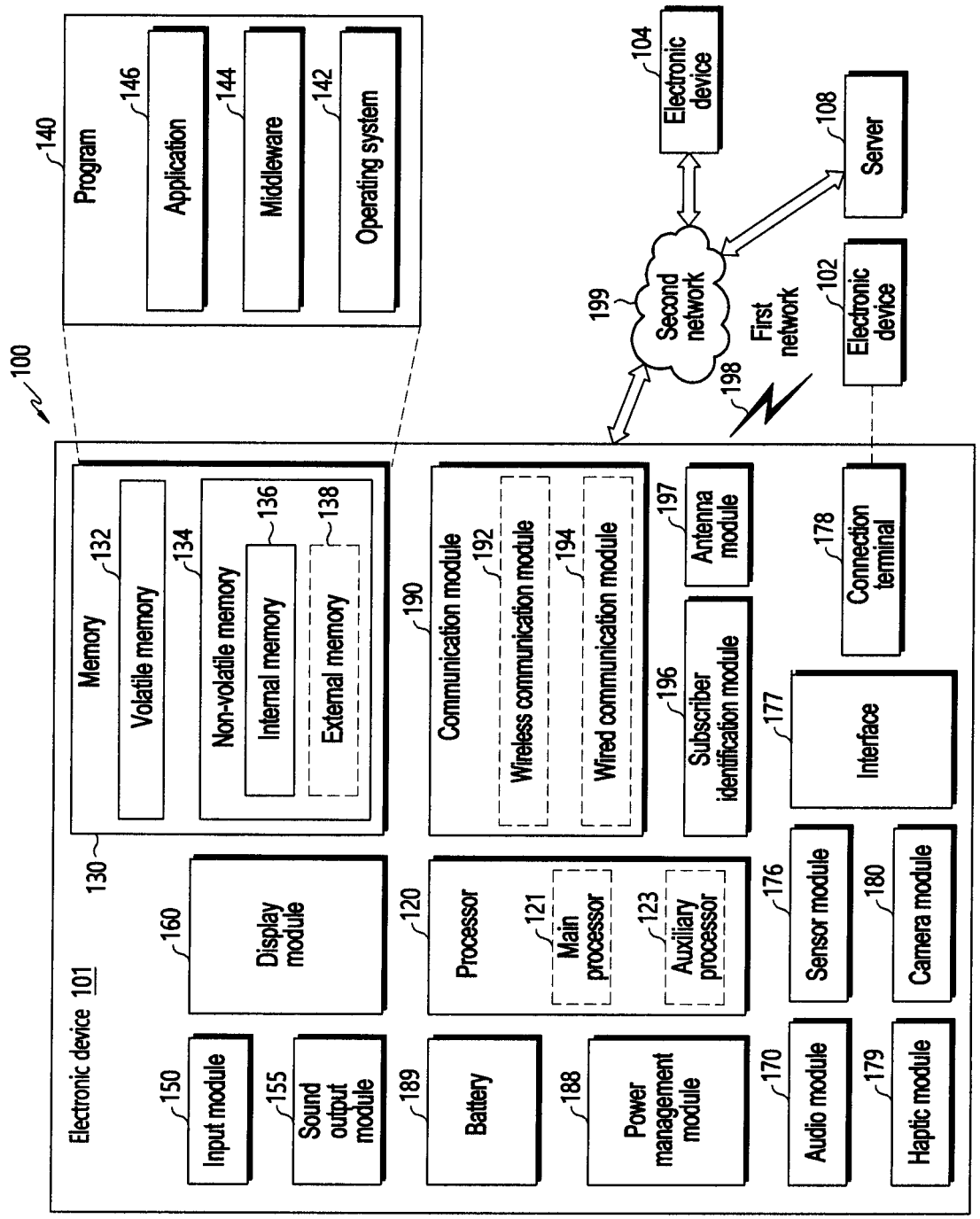
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)). The term "processor" shall be understood to refer to both the singular and plural contexts in this document.

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

According to certain embodiments, the wireless communication module 192 of the electronic device 101 may include at least one of a WLAN communication module, a Bluetooth communication module, a Zigbee communication module, and a UWB communication module.

UWB may refer to a short-range high-rate wireless communication technology using a wide frequency band of several GHz or more, low spectral density, and short pulse width (e.g., 1 nsec to 4 nsec) in a baseband state. UWB may mean a band itself to which UWB communication is applied. UWB may enable secure and accurate ranging between devices.

Through TDOA ranging, electronic device 101 may receive DTMs from anchor devices located nearby. Since the anchors have known locations, the electronic device 101 can calculate its position using time measurements received from the DTMs. FIGS. 2-7D describe TDOA ranging.

Figure 8:
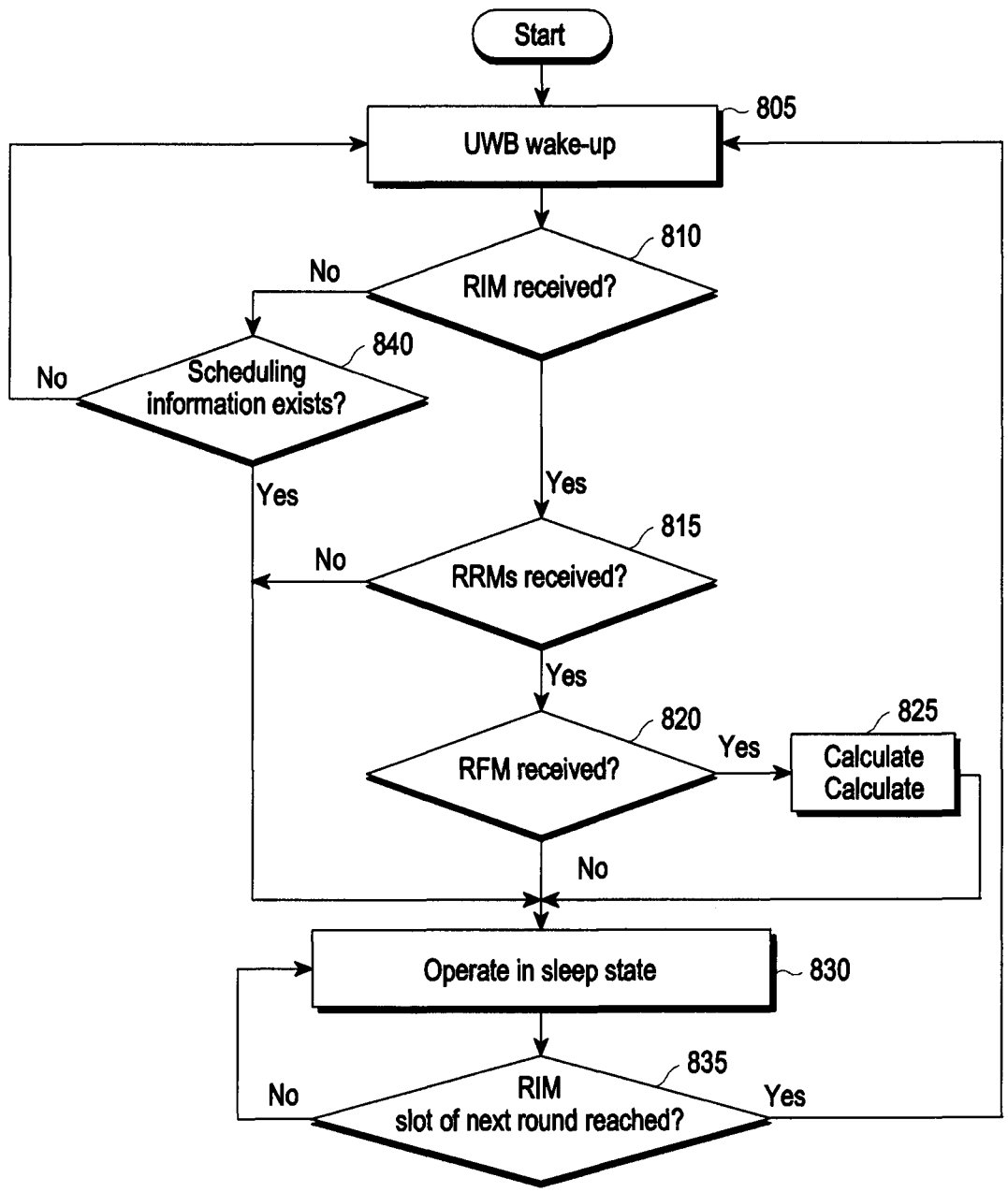
FIG. 8 is a flowchart illustrating an operation for an electronic device to receive downlink TDOA messages according to certain embodiments of the disclosure.

However, keeping the electronic device 101 in a wake-up state for TDOA ranging consumes a large amount of power from the battery 189. Since the electronic device 101 relies on the battery for power, that battery can become depleted. Accordingly, electronic device 101 may use a power efficient method to have the benefits of TDOA ranging while preserving the battery 189. FIG. 8 describe the wake-up and sleep state sequences of the electronic device during TDOA ranging.

Operations of a UWB-based service may include a service initiation step for initiating the UWB-based service, a key provisioning step for providing a key for security, a discovery step for discovering a device, a connection step including secure channel creation and parameter exchange, and/or a UWB ranging step for measuring a distance/direction (angle) between devices.

Terms used in certain embodiments of the disclosure may be defined as follows.

Anchor is a UWB equipped device known to other UWB devices and may be placed in a fixed position.

Master anchor may be an anchor device capable of supporting both a role as an initiator and a role as a responder.

Slave anchor may be an anchor device supporting only the role as a responder.

Initiator may mean a master anchor initiating TDOA ranging.

Responder may mean a master or slave anchor responding to the initiator.

Downlink TDOA may mean a localization scheme based on the TDOA of messages transmitted from anchor devices.

Downlink TDOA message (DTM) may mean the UWB message transmitted by anchor devices for downlink TDOA.

Electronic device may mean a mobile device with UWB capability, which may overhear downlink TDOA messages and may calculate its own location based on the downlink TDOA, such as but not limited to electronic device 101 of FIG. 1. Electronic device may also mean User Equipment (UE). The foregoing are examples of electronic devices, but electronic devices is not limited thereto.

Ranging block may mean a time period for ranging.

TDOA Ranging

Figure 2:
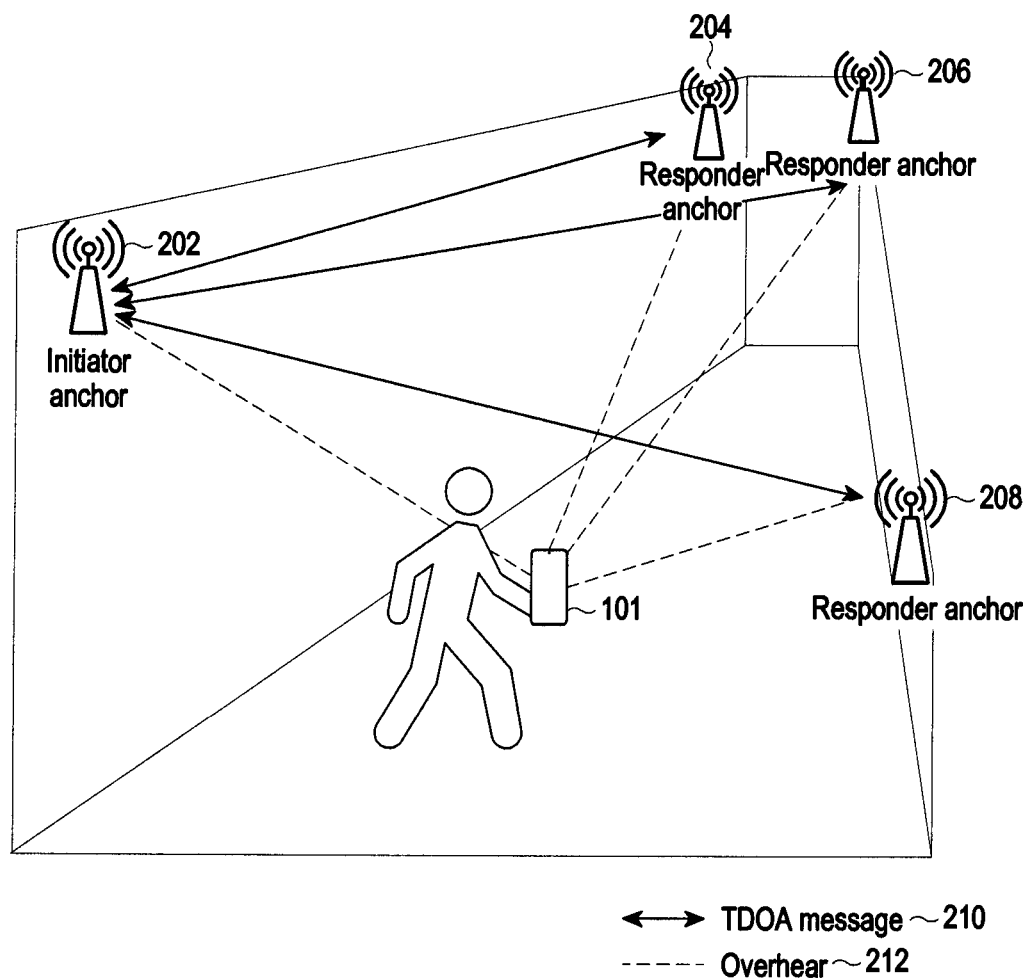
FIG. 2 illustrates an example of a downlink TDOA-based positioning system.

FIG. 2 illustrates an example of a downlink TDOA-based positioning system.

Referring to FIG. 2, a plurality of anchor devices 202, 204, 206, and 208 may exchange downlink TDOA messages. The anchor devices 202, 204, 206, and 208 are installed at an earlier time and are not generally moved. Information about the positions of the anchor devices 202, 204, 206, and 208 may be stored in the electronic device 101. In one embodiment, the positions may be transferred wirelessly or previously stored in the electronic device 101. In another embodiment, the positions may be stored in a server (e.g., the server 108 of FIG. 1), and the electronic device 101 may download the information about the positions from the server.

The anchor devices 202, 204, 206, and 208 may be positioned on the lines of sight of the electronic device 101. A predetermined protocol may establish the transmission timings and roles (e.g., initiator or responder) of anchor devices 202, 204, 206, and 208 in a specific slot may prior to downlink TDOA operation.

The anchor devices 202, 204, 206, and 208 may support at least one of the two roles, which may include a role as an initiator and a role as a responder. An anchor device acting as an initiator (e.g., an initiator anchor 202) may initiate a ranging round, and anchor devices acting as responders (e.g., responder anchors 204, 206, and 208) may respond to the initiator anchor 202.

The electronic device 101 may overhear 212 the downlink TDOA messages 210 exchanged between the initiator anchor 202 and the responder anchors 204, 206, and 208. When this occurs, the electronic device 101 can measure the TDOA of the downlink TDOA messages 210. For example, to obtain the position of the electronic device 101 in a two-dimensional space, the electronic device 101 may need to measure TDOAs from at least three anchor devices. In a three-dimensional space, TDOAs for at least four anchor devices may be used. Based on the measured values of the TDOAs and the given positions of the anchor devices 202, 204, 206, and 208, the electronic device 101 may estimate its own position.

Keeping the electronic device 101 in a wake-up state during the entire time of receiving the TDOA messages 210 consumes a large amount of power from the battery 189. Accordingly, electronic device 101 may use the method(s) described FIGS. 8-15 while receiving the TDOA messages and positioning.

Figure 3:
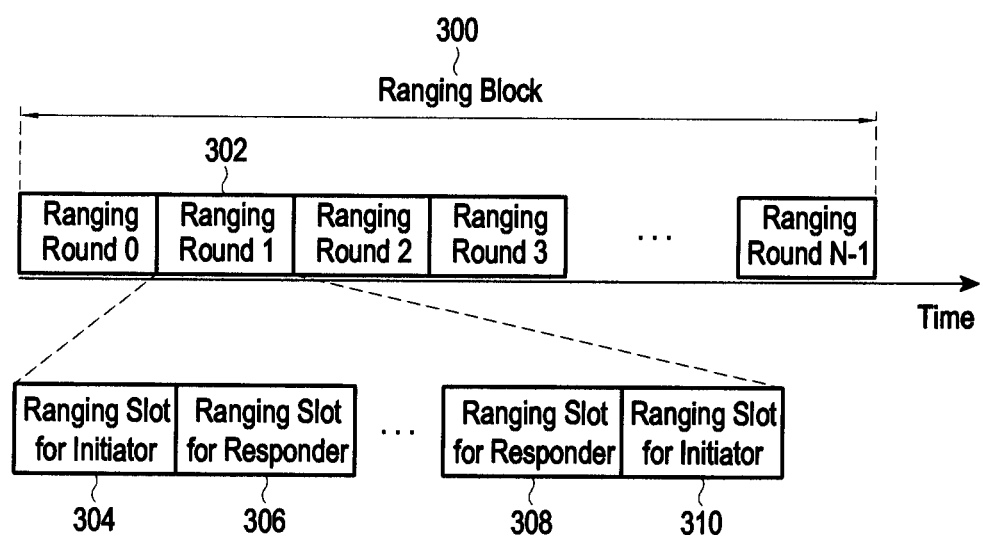
FIG. 3 illustrates a ranging block structure used for downlink TDOA.

FIG. 3 illustrates a ranging block structure used for downlink TDOA.

Referring to FIG. 3, a ranging block 300 may include N ranging rounds. The length of the ranging block 300 may be determined considering delay requirements. For example, the length of the ranging block 300 may be determined to be shorter than 100 ms. The number of ranging rounds in one ranging block 300 may be determined considering the performance of anchor devices (e.g., the density of master anchors) and the requirements for downlink TDOA. Although not shown, in an embodiment, a guard time may be applied between ranging rounds.

The number of ranging slots included in each ranging round (e.g., ranging round 1 302) may be determined based on the number of responder anchors covered by each initiator anchor. In an embodiment, each ranging slot may be defined as a unit time interval during which one downlink TDOA message may be transmitted. The master anchor (which may be, e.g., an initiator anchor) may manage the ranging round and may transmit information about the ranging round to responder anchors through DTMs. In an embodiment, the number of ranging slots 304, 306, 308, and 310 included in one ranging round may be larger than (e.g., the number of responders)+2. In one embodiment, the first ranging slot 304 and the last ranging slot 310 may be designated for use by the initiator anchor, and the remaining ranging slots (e.g., ranging slots 306 and 308) may be respectively assigned to the responder anchors.

If the electronic device 101 receives a RIM, at least a given number of RRMs, and a RFM, the electronic device 101 can enter the sleep state until the RIM slot in the next ranging round. This allows the electronic device 101 to conserve energy.

Figure 4:
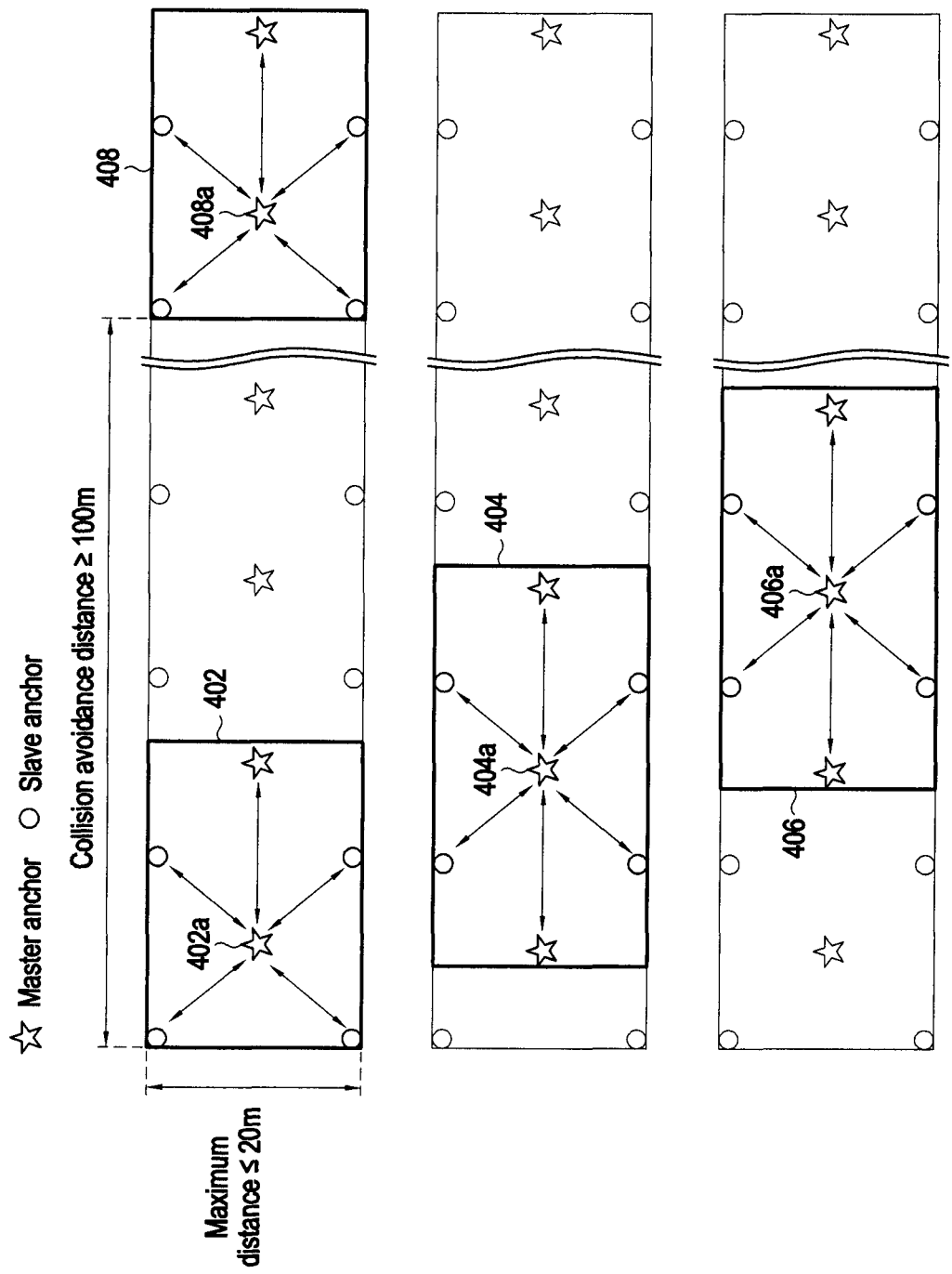
FIG. 4 is a view illustrating downlink TDOA according to a distribution of anchor devices.

FIG. 4 is a view illustrating an example of downlink TDOA according to a distribution of anchor devices.

Referring to FIG. 4, one cell (e.g., the cell 402, 404, 406, or 408) may consist of one initiator anchor (e.g., the anchor device 402a, 404a, 406a, or 408a) and three or more responder anchors. Two anchor devices in different cells (e.g., cells 402 and 408) transmitting downlink TDOA messages within a first ranging round may maintain a distance (e.g., about 100 meters) for collision avoidance. Master anchors 402a and 408a arranged to be spaced apart by a designated distance or more may act as initiator anchors to transmit downlink TDOA messages within the same first ranging round.

For example, when the electronic device 101 is located in the cell 402, the electronic device 101 may (1) receive a RIM from the master anchor 402a during the first ranging round, (2) receive at least two RRMs from the slave anchors in the cell 402, and (3) receive an RFM from the master anchor 402a. For example, when the electronic device 101 is located in the cell 408, the electronic device 101 may receive a RIM from the master anchor 408a during the first ranging round, receive at least two RRMs from the slave anchors in the cell 408, and receive an RFM from the master anchor 408a. According to an embodiment, the TDOA ranging operation may be performed in a plurality of cells (e.g., cell 402 and cell 408) within one ranging round (e.g., first ranging round). For example, when a large space needs to be covered, a TDOA ranging operation may be performed in a plurality of cells within one ranging round.

Within a second ranging round, the master anchor 404a in the cell 404 may initiate TDOA ranging, and the slave anchors in the cell 404 may respond to the downlink TDOA message from the master anchor 404a. Likewise within the third ranging round, the master anchor 406a in the cell 406 may initiate TDOA ranging, and the slave anchors in the cell 406 may respond to the downlink TDOA message from the master anchor 406a.

According to an embodiment, a plurality of master anchors 402a and 404a that may support both the roles of initiator and responder may be located in one cell (e.g., cell 402), and one master anchor (e.g., master anchor 402a) may act as an initiator, and the other master anchor (e.g., master anchor 404a) may act as a responder. In the other cell (e.g., cell 404), one master anchor (e.g., master anchor 402a) may act as a responder, and the other master anchor (e.g., master anchor 404a) may act as an initiator.

Figure 5:
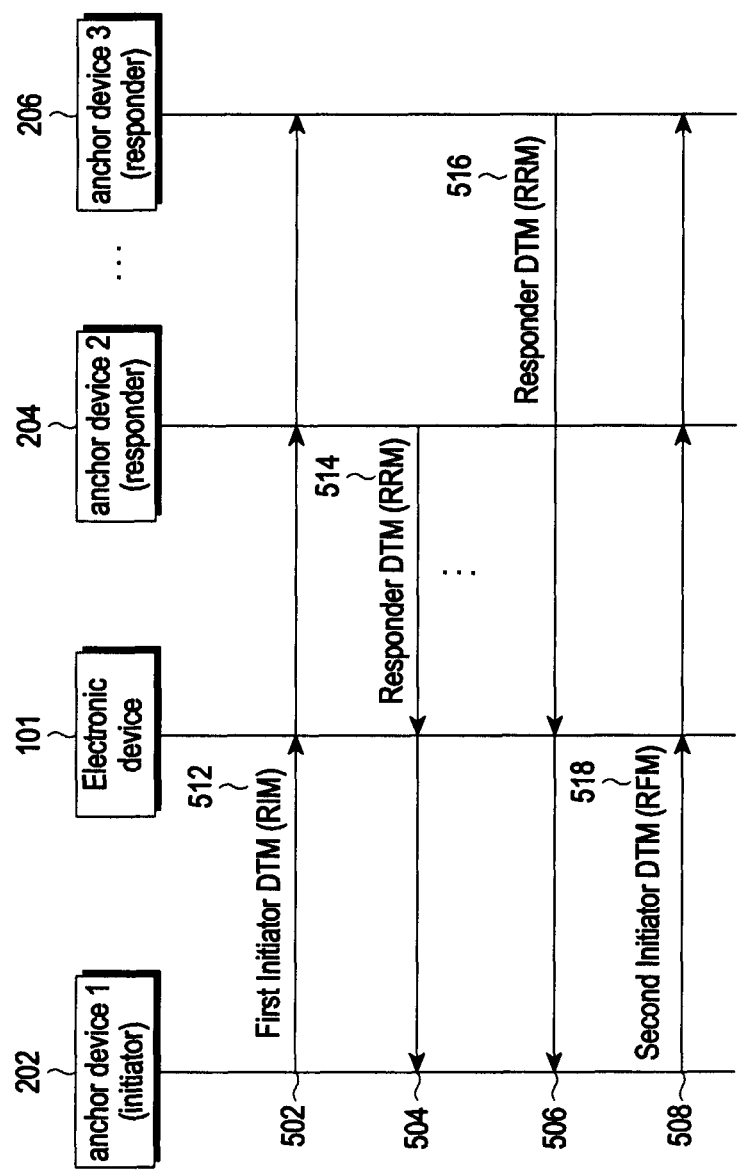
FIG. 5 illustrates a message exchange procedure in a ranging round according to an embodiment of the disclosure.

FIG. 5 illustrates a message exchange procedure in a ranging round according to an embodiment of the disclosure. In FIG. 5, anchor device 1 202 may be an initiator anchor, and anchor device 2 204 to anchor device N 206 may be responder anchors in the same cell.

Referring to FIG. 5, in operation 502, anchor device 1 202 may transmit a first initiator downlink TDOA message (DTM) (hereinafter, referred to as a ranging initiation message (RIM)) 512. The RIM 512 may be transmitted in an allocated ranging slot (e.g., the ranging slot 304 of FIG. 3) within a ranging round. Allocated ranging slot 304 may be referred to as a RIM slot. The RIM 512 may include scheduling information for the ranging round. The scheduling information may be previously set. The scheduling information may be stored in a server and received from the server to the electronic device 101. The scheduling information may be provided from anchor device 1 202 to the electronic device 101 using another communication scheme (e.g., Bluetooth low energy (BLE)).

The scheduling information may include information to define a ranging block structure (which may include, e.g., the number and length of ranging rounds, and/or the number and length of ranging slots) for the ranging round and subsequent ranging rounds. The RIM 512 may be received by the electronic device 101 and anchor device 2 204 to anchor device N 206. The electronic device 101 and anchor device 2 204 to anchor device N 206 may recognize that the ranging round is started by the RIM 512 and may recognize the ranging block structure (e.g., the arrangement of ranging slots) for the ranging round and subsequent ranging rounds based on the scheduling information.

In operations 504 and 506, in response to the RIM 512, anchor device 2 204 through anchor device N 206 may transmit responder downlink TDOA messages (responder DTMs) (hereinafter referred to as ranging response messages (RRMs)) 514 and 516 in their corresponding ranging slots (e.g., the ranging slots 306 and 308 of FIG. 3) in the ranging round. Each corresponding ranging slot 306 or 308 may be referred to as an RRM slot. A corresponding ranging slot for each anchor device 204 or 206 may be allocated by scheduling information that may be included in the RIM or previously configured, for example. The RRMs 514 and 516 may be received by the electronic device 101 and anchor device 1 202.

In operation 508, in response to the RRMs 514 and 516, anchor device 1 202 may transmit the second initiator downlink TDOA message (DTM) (hereinafter, referred to as a ranging final message (RFM)) 518 in the ranging slot (e.g., the ranging slot 310 of FIG. 3) allocated in the ranging round, and the allocated ranging slot 310 may be referred to as an RFM slot. The RFM 518 may include round trip time and response time parameters. For example, the RFM 518 may include the round trip time calculated based on at least one RRM (e.g., the RRM 514 and the RRM 516) received in response to the RIM 512 transmitted from anchor device 1 202. The electronic device 101 may calculate its own position based on the RIM 512, the RRMs 514 and 516, and the RFM 512.

Figure 6:
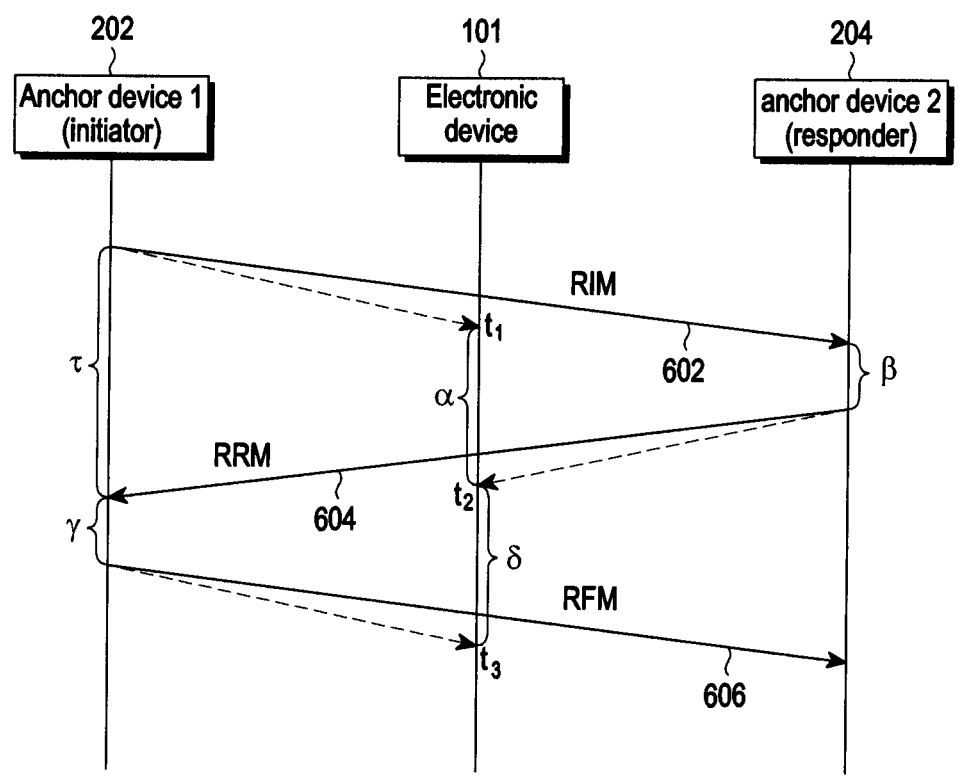
FIG. 6 illustrates a message flow for describing time measurement-based localization in a ranging round.

FIG. 6 illustrates a message flow for describing time measurement-based localization in a ranging round.

Referring to FIG. 6, in operation 602, the electronic device 101 may receive a RIM (e.g., RIM 512) from the anchor device 202. In operation 604, the electronic device 101 may receive an RRM (e.g., the RRM 514 or 516) from anchor device 2 204. In operation 606, the electronic device 101 may receive an RFM (e.g., the RFM 518) from anchor device 1 202.

The RRM 514 or 516 may provide a reply time of the responder β to the electronic device 101. Further, anchor device 2 204 may obtain β by compensating for the clock drift and offset for anchor device 1 202. The RFM 518 may provide a round-trip time of the initiator τ and a reply time of the initiator γ to the electronic device 101.

The electronic device 101 may measure the time interval a between the reception time $t_1$ of the RIM 512 and the reception time $t_2$ of the RRM 514 or 516 and the time interval δ between $t_2$ and the reception time $t_3$ of the RFM 518 using β, τ, and γ.

The electronic device 101 may calculate the distance difference between the distance $d_1$ between itself and the anchor device 1 202 and the distance $d_2$ between itself and anchor device 2 204 using Equation 1 as follows:

$$d_2 - d_1 = \left((\alpha - \delta) * \frac{\tau + \gamma}{\alpha + \delta} - (\beta - \gamma)\right) * C/2 \quad \text{[Equation 1]}$$

Here, C refers to the speed of light.

With three or more distance difference values calculated that are related to the same initiator anchor and different responder anchors, the electronic device 101 may calculate its own position.

In one embodiment, an anchor device, which used to operate as an initiator anchor in one ranging round, may operate as a responder anchor in another ranging round.

After the RFM in operation 606, the electronic device 101 can enter the sleep mode until the RIM slot in ranging round 2.

FIGS. 7A to 7D (hereinafter, collectively referred to as FIG. 7) are views for describing a format of a downlink TDOA message 702 used in certain embodiments of the disclosure. A downlink TDOA message 702 may be, e.g., any one of the RIM 512, RRMs 514 and 516, and the RFM 518 of FIGS. 5 and 6.

Figures 7A, 7B:
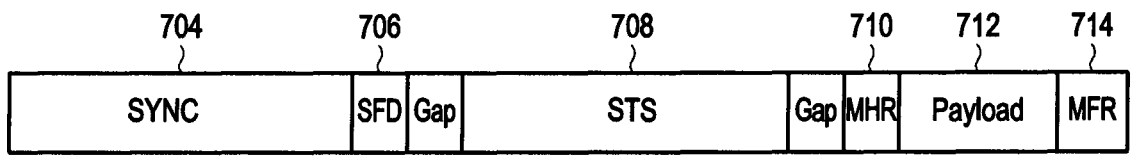

Referring to FIG. 7A, the downlink TDOA message 702 may include at least one of a synchronization (SYNC) field 704, a start frame delimiter (SFD) field 706, a scrambled timestamp sequence (STS) field 708, a media access control (MAC) header (MHR) 710, a payload information element (IE) content field 712, or a MAC footer (MFR) 714. According to an embodiment, a gap may be located between the SFDC field 706 and the STS field 708 and/or between the STS field 708 and the MHR field 710.

The SYNC field 704 may include a previously given preamble code index. The SFD field 706 may indicate that the preamble ends and the physical header fields begin. The STS field 708 may include a sequence of pseudo-randomized pulses. The MAC header (MHR) 710 is described below in connection with FIG. 7B. The MFR 714 may include a frame identify sequence.

FIG. 7B is a view for describing an example of a format of a MAC header (MHR) 710 used in certain embodiments of the disclosure.

Referring to FIG. 7B, the MAC header (MHR) 710 may include at least one of a frame control field 722, a source address field 724, or a MAC header field 726. The frame control field 722 may include control information related to the TDOA message 702. The source address field 724 may contain the address (or short address) of the originator sending the downlink TDOA message 702.

FIG. 7C is a view for describing an example of a format of the payload IE content field 712 used in certain embodiments of the disclosure.

Referring to FIG. 7C, the payload IE content field 712 may include at least one of a manufacturer organizational unique identifier (OUI), a UWB message identifier (ID), a message control field, a block index field, a round index field, a transmission (TX) timestamp field, a ranging device management list field 732, a clock frequency offset (CFO) field, a first round-trip time field, or a reply time list field.

The value 0x08 of the UWB message ID may indicate a downlink TDOA message. The block index field and the round index field may indicate the block index of the current ranging block and the block index of the current ranging round, respectively. The ranging device management list field 732 may include N ranging device management elements. The CFO field may indicate a center frequency offset related to the initiator field. The first round trip time field may indicate a transmission time difference between the RIM and the RRM. Each element of the response time list may include the address of the anchor device and the response time field.

FIG. 7D is a view for describing an example of a format of the ranging device management list field 732 used in certain embodiments of the disclosure.

Referring to FIG. 7D, each element in the ranging device management list field 732 may include at least one of a ranging role field, a ranging slot index field, an address field, a scheduled UWB message, or a stop ranging field. The ranging role field may have a value indicating either a responder or an initiator. The ranging slot index field may include a value indicating a slot allocated to the responder anchor identified by the address field. The address field may include the address of the responder anchor. The scheduled UWB message may include the ID of the UWB message to be carried in the current slot. The stop ranging field may include a value indicating whether ranging is to be continued or stopped.

The UWB communication module in the wireless communication module 192 may be required to stay in a wake-up state (or active or on) in order for the electronic device 101 to receive downlink TDOA messages from the initiator anchor and responder anchors in the downlink TDOA. This downlink TDOA operation may waste power of the electronic device 101.

In certain embodiments, after waking up the UWB communication module and starting the downlink TDOA operation, the electronic device 101 may maintain the wake-up state until it successfully receives a set of a RIM (e.g., the RIM 512 of FIG. 5) and a given number of (e.g., two or more) RRMs (e.g., the RRMs 514 and 516) and RFM (e.g., the RFM 518 of FIG. 5) in one ranging round. Upon successful reception of one set of RIM, RRMs, and RFM during one ranging round, the electronic device 101 may set the UWB communication module to a sleep state. Here, setting the UWB communication module to the sleep state may include the operation of deactivating the entire UWB communication module or the operation for deactivating at least part (e.g., the RF unit and/or physical layer) of the UWB communication module. In an embodiment, the sleep state of the UWB communication module may be defined as a state in which the UWB communication module is driven with minimal power to be quickly switched to the wake-up state.

The electronic device 101 may remain in the sleep state until before it wakes up to receive an RIM in a RIM slot of a subsequent ranging round (e.g., the immediately next ranging round or a next ranging round allocated to the electronic device 101). According to an embodiment, if waking up in the RIM slot to receive a RIM and successfully receiving a RIM, the electronic device 101 may maintain the wake-up state and, if waking up in the RIM slot but failing to successfully receive a RIM, the electronic device 101 may maintain the sleep state of the UWB communication module up to a RIM slot included in a next ranging round.

Conserving Power

As noted above, maintaining the electronic device 101 continuously in the wake-up mode consumes a large amount of power from the battery. Accordingly, after the electronic device 101 receives a RIM from an initiator anchor, RRMs from a predetermined number of anchors, and an RFM from the initiator anchor, the electronic device 101 can enter the sleep state until the RIM slot of the next ranging round.

FIG. 8 is a flowchart illustrating an operation for an electronic device to receive downlink TDOA messages according to certain embodiments of the disclosure. Operations 805 to 840 of FIG. 8 may be performed by a processor (e.g., the processor 120 of FIG. 1) and a communication module (e.g., a UWB communication module) included in an electronic device (e.g., the electronic device 101 of FIG. 1). In certain embodiments, at least one of the illustrated operations may be changed, omitted, or reordered.

Referring to FIG. 8, in operation 805, the processor 120 of the electronic device 101 may operate (e.g., activate) the UWB communication module in a wake-up state. In an embodiment, the processor 120 may set the UWB communication module to the wake-up state in response to the user's request for UWB communication or detecting execution of an application using UWB communication. For example, the processor 120 may first set the UWB communication module to the wake-up state when the user starts the map application to use the downlink TDOA. As another example, UWB communication may be used in applications requiring precise positioning, short-range communication for providing a short-range service, and/or automatic lock/unlock service for car key or door lock based on the user's location. According to certain embodiments, the processor 120 may detect execution of an application requiring communication through the UWB communication module and perform an operation (e.g., activation of the UWB communication module) related thereto.

The processor 120 may trigger UWB communication through another communication scheme, e.g., Bluetooth low energy (BLE) communication. For example, the processor 120 may receive scheduling information for UWB communication and/or a trigger command for UWB communication from an external electronic device (e.g., a master anchor, an initiator anchor, or another electronic device) through another communication scheme (e.g., at least one of BLE or Wi-Fi). The scheduling information may define a ranging block structure (e.g., the ranging block 300 of FIG. 3) for UWB communication. The scheduling information may indicate a ranging block allocated to the electronic device 101 or at least one ranging round in each ranging block allocated to the electronic device 101. The electronic device 101 may start performing operation 805 within every ranging round of the allocated ranging block, the allocated ranging round within each ranging block, or the allocated ranging round within the allocated ranging block.

In operation 810, the processor 120 may determine whether a RIM (e.g., the RIM 512 of FIG. 5) transmitted from an initiator anchor for UWB communication is received. In an embodiment, the RIM may include at least one of fields according to the downlink TDOA message formats of FIGS. 7A to 7D. If the RIM is not received, in operation 840, the processor 120 may determine whether scheduling information for UWB communication is stored. If the position of the next RIM slot may be identified according to the scheduling information, the processor 120 may proceed to operation 830 to sleep up to the RIM slot of the next ranging round. If the scheduling information for UWB communication is not stored, the processor 120 may return to operation 805 while maintaining the wake-up state.

When it is determined that the first RIM is not received after UWB communication is initiated in operation 810, the processor 120 may maintain the UWB communication module in the wake-up state and return to operation 805. When it is determined that the second and subsequent RIMs are not received after UWB communication is initiated in operation 810, the processor 120 may proceed to operation 830 to switch the UWB communication module to the sleep state. In this case, operation 840 may be omitted.

By receiving a RIM transmitted from the initiator anchor (e.g., operation 502 of FIG. 5) after switching the UWB communication module to the wake-up state, the processor 120 may identify that the ranging round (e.g., ranging round 1 302 of FIG. 3, hereinafter referred to as a first round) including the RIM slot when the RIM is received is initiated and may identify the positions of the remaining ranging slots (e.g., the ranging slots 306, 308, and 310) in the first ranging round 302 from the scheduling information that may be included in the RIM.

When the RIM is received in the RIM slot 304 in the first ranging round 302, in operation 815, the processor 120 may monitor reception of downlink TDOA messages responsive to the RIM in the ranging slots (e.g., the ranging slots 306 and 308) in the first ranging round 302 and determine whether the RRMs (e.g., operations 504 and 506 of FIG. 5) responsive to the RIM are successfully received in the ranging slots 306 and 308 as a result of monitoring. If a given number (e.g., two or three) of RRMs or more RRMs are received, the processor 120 may proceed to operation 820 while maintaining the UWB communication module in the wake-up state. On the other hand, if a given number of RRMs are not received in the RRM slots in the first ranging round 302, the processor 120 may proceed to operation 830 to set the UWB communication module to the sleep state.

In operation 820, the processor 120 may monitor whether the RFM from the initiator anchor is received in the allocated RFM slot within the first ranging round.

According to an embodiment, if the RFM is received, the processor 120 may calculate the position of the electronic device 101 based on the RIM, RRMs, and RFM in operation 825. In an embodiment, the processor 120 may calculate the position of the electronic device 101 using the distance difference described in connection with FIG. 6 and Equation 1. According to an embodiment, the processor 120 may set the UWB communication module to the sleep state in operation 830 while calculating the position of the electronic device 101 immediately after receiving the RFM or after receiving the RFM. For example, operations 825 and 830 may be performed substantially simultaneously.

According to another embodiment, if the RFM is not received in operation 820, the processor 120 may determine that it has failed to calculate the position of the electronic device 101 in the first ranging round. If the RFM is not received in operation 820, the processor 120 may switch the UWB communication module to the sleep state in operation 830. According to an embodiment, the processor 120 may separately store information (e.g., information for the round index and/or relevant anchor devices) for the ranging round where the RIM, a designated number of RRMs, and RFM are normally received and/or information (e.g., round index) for the ranging round where the RIM, the designated number of RRMs, and RFM are not normally received.

In an embodiment, the first ranging round may be a first ranging round where the RIM is successfully received after UWB communication is initiated. In an embodiment, the first ranging round may be a ranging round related to the electronic device 101 (e.g., a ranging round selected according to the embodiment of FIG. 10, 11, or 12).

Successful reception of the RIM, RRMs, and RFM in one ranging round may include, e.g., as illustrated in FIG. 5, the operation of receiving the RIM transmitted from the initiator anchor in a designated RIM slot (e.g., ranging slot 304) in the first ranging round, the operation of receiving RRMs respectively transmitted from different responder anchors in response to the RIM in the RRM slots (e.g., the ranging slots 306 and 308) in the first ranging round, and the operation of receiving the RFM transmitted from the initiator anchor in a designated RFM slot (e.g., ranging slot 310) in the first ranging round.

In operation 830, the processor 120 may set the UWB communication module to the sleep state. Setting the UWB communication module to the sleep state may include deactivating the entire UWB communication module or deactivating at least part of the UWB communication module.

In operation 835, the processor 120 may determine whether the RIM slot allocated within the second ranging round has been reached. In one embodiment, the processor 120 may identify the position of the RIM slot of the second ranging round based on the scheduling information included in the RIM received in the first ranging round and maintain the UWB communication module in the sleep state until the RIM slot is reached. In an embodiment, the second ranging round may be a ranging round immediately subsequent to the first ranging round or may be a ranging round (e.g., a ranging round selected according to any one embodiment of FIGS. 10 to 12) related to the electronic device 101 and subsequent to the first ranging round. If the RIM slot of the second ranging round is not reached, the processor 120 may return to operation 830 and maintain the UWB communication module in the sleep state. In contrast, if the RIM slot of the second ranging round is reached, the processor 120 may return to operation 805.

In operation 805, the processor 120 may set the UWB communication module to the wake-up state in the RIM slot of the second ranging round and, in operation 810, determine whether a RIM is received from the initiator anchor during the RIM slot. In an embodiment, the RIM received in the second ranging round may be transmitted from the same or different initiator anchor as/from that in the first ranging round. If the RIM is received in the RIM slot of the second ranging round, the processor 120 may proceed to operation 815 while maintaining the UWB communication module in the wake-up state, performing subsequent operations 815 and 820 of monitoring RRMs and RFM. In contrast, if the RIM is not received in the RIM slot of the second ranging round, the processor 120 may switch the UWB communication module to the sleep state and proceed to operation 830. In other words, when the RIM is not received in the RIM slot of the second ranging round, the processor 120 may determine that there is no need to receive RRMs or RFMs in the second ranging round.

In an embodiment, the processor 120 may set the UWB communication module to the sleep state for a guard time from the second ranging round to before the next ranging round. Although not shown, in an embodiment, if the RFM slot of the second ranging round is the last slot of the second ranging round, and the processor 120 monitors reception of a RIM in the RIM slot of the very next ranging round, the processor 120 may proceed to operation 835 to receive a RIM in the next ranging round while maintaining the wake-up state.

Although not shown, in an embodiment, the electronic device 101 may maintain the UWB communication module in the wake-up state until it successfully receives the RIM, RRMs, and RFM in one ranging round. In this case, when the electronic device 101 successfully receives the set of RIM, RRMs and RFM for the first time in the first ranging round while maintaining the UWB communication module in the wake-up state, the electronic device 101 may switch the UWB communication module to the sleep state and proceed to operation 830.

Although not shown, the operations of FIG. 8 may be repeatedly performed, as an example, until an application using UWB communication in the electronic device 101 is terminated or is determined to be terminated by the processor 120. In an embodiment, when the RIM, the designated number of RRMs and RFM are not normally received through operations 810, 815 and 820, the processor 120 may count the number of reception failures and determine whether the number of reception failures exceeds a threshold. For example, the number of reception failures may mean the number of ranging rounds in which the set of the RIM, the designated number of RRMs, and RFM is not normally received within a given time range. When the number of reception failures exceeds the threshold, the processor 120 may terminate or temporarily stop the ranging procedure for UWB communication.

Figure 9:
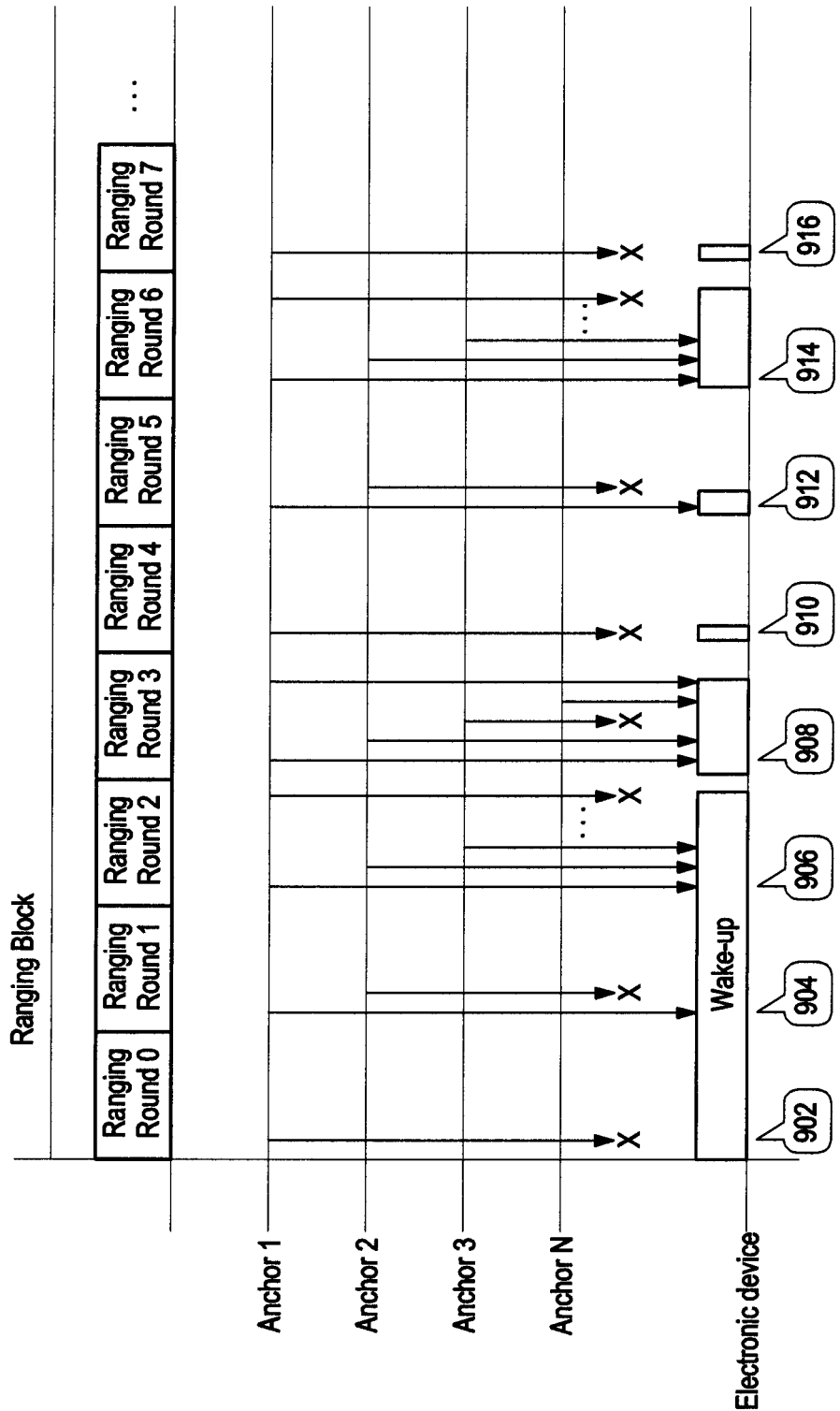
FIG. 9 is a timing diagram for describing an operation in which an electronic device wakes up in a RIM slot of a ranging round according to an embodiment of the disclosure.

FIG. 9 is a timing diagram for describing an operation in which an electronic device wakes up in a RIM slot of a ranging round according to an embodiment of the disclosure. Although a plurality of ranging rounds included in the same ranging block are illustrated, the illustrated plurality of ranging rounds may be included in the same ranging block or different ranging blocks.

Referring to FIG. 9, the electronic device 101 may wake up the UWB communication module and start monitoring RIM reception during the RIM slot in ranging round 0. In ranging round 0 of time 902, the electronic device 101 may fail to receive the RIM in ranging round 0. In ranging round 1 of time 904, the electronic device 101 succeeds in receiving the RIM, but fails to receive the RRMs and may set the UWB communication module to the sleep state. Thereafter, the electronic device 101 may maintain the UWB communication module in the sleep state up to the RIM slot of ranging round 2.

In the RIM slot within ranging round 2 of time 906, the electronic device 101 may switch the UWB communication module to the wake-up state. In ranging round 2, the electronic device 101 successfully receives the RIM (e.g., transmitted from anchor device 1) and two RRMs (e.g., transmitted from anchor device 2 and anchor device 3) but may fail to receive the RFM (e.g., transmitted from anchor device 1). The electronic device 101 may maintain the UWB communication module in the sleep state up to the RIM slot of ranging round 3. Although not shown, in an embodiment, the electronic device 101 may maintain the UWB communication module in the wake-up state until it successfully receives the RIM, RRMs, and RFM in one ranging round.

In ranging round 3 of time 908, the electronic device 101 may successfully receive the RIM (e.g., transmitted from anchor device 1), three RRMs (e.g., transmitted from anchor device 2 and anchor device N), and RFM (e.g., transmitted from anchor device 1). After identifying successful reception of the RIM, RRMs, and RFM, the electronic device 101 may switch the UWB communication module to the sleep state.

In ranging round 4 of time 910, the electronic device 101 may wake up in a given RIM slot to monitor reception of the RIM. If reception of the RIM is not detected in the RIM slot, the electronic device 101 may switch the UWB communication module to the sleep state at least after the RIM slot.

In ranging round 5 of time 912, the electronic device 101 may receive a RIM in a given RIM slot and monitor reception of RRMs in the RRM slots while maintaining the wake-up state. Upon failing to receive a designated number (e.g., two or three) of RRMs in the RRM slots, the electronic device 101 may switch the UWB communication module to the sleep state.

In ranging round 6 of time 914, the electronic device 101 may receive a RIM in a given RIM slot, receive RRMs in given RRM slots, and monitor reception of an RFM in a given RFM slot while maintaining the wake-up state. After the RFM slot, the electronic device 101 may switch the UWB communication module to the sleep state. FIG. 9 illustrates that in ranging round 6, the electronic device 101 fails to normally receive an RFM in an RFM slot. In this case, even when the electronic device 101 receives a designated number of RRMs, the electronic device 101 may not reference ranging round 6 in calculating the position of the electronic device 101.

In ranging round 7 of time 916, the electronic device 101 may wake up in a given RIM slot to monitor reception of the RIM. If reception of the RIM is not detected in the RIM slot, the electronic device 101 may switch the UWB communication module to the sleep state at least after the RIM slot and until before the RIM slot of the next ranging round.

Through the above-described operations, the electronic device 101 may reduce the time during which the UWB communication module operates in the wake-up state and may save power consumption.

Figure 10:
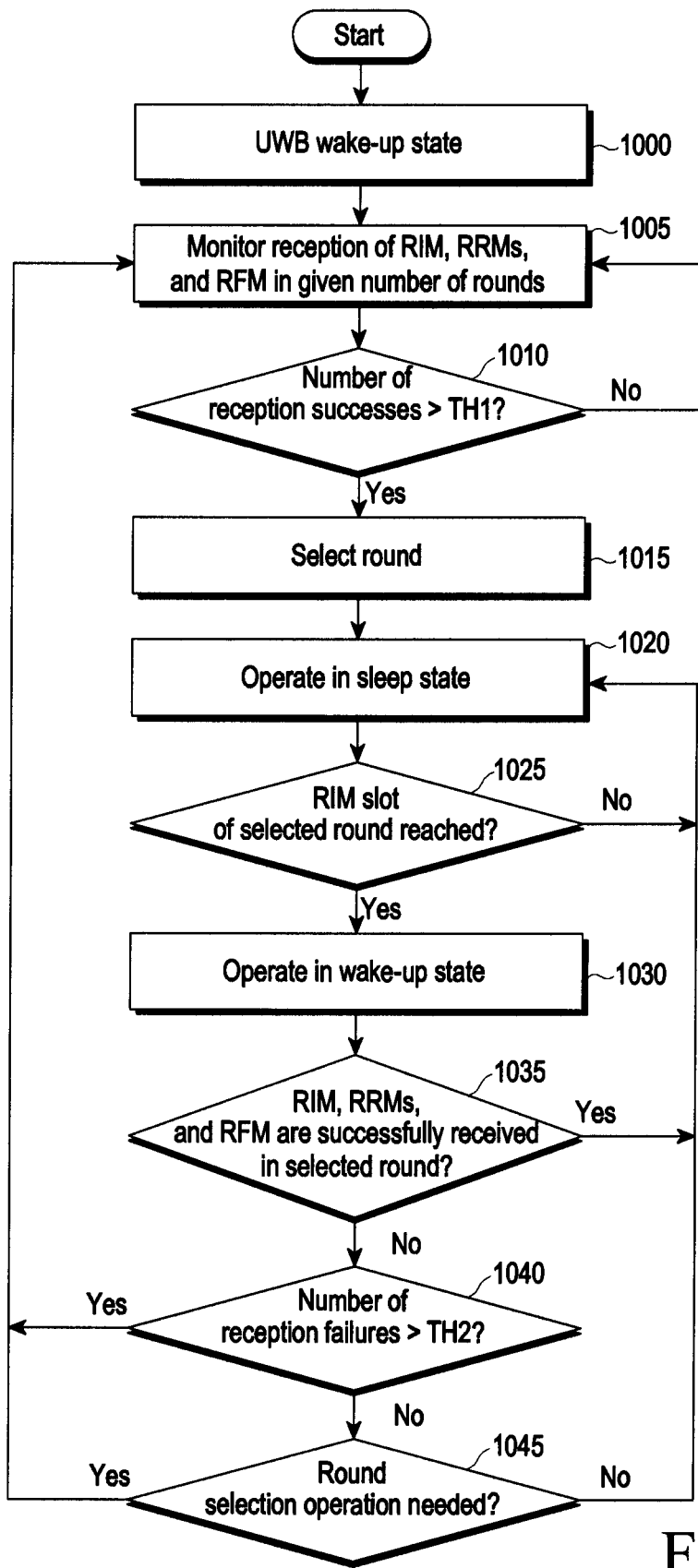
FIG. 10 is a flowchart illustrating an operation for an electronic device to receive downlink TDOA messages according to certain embodiments of the disclosure.

FIG. 10 is a flowchart illustrating an operation for an electronic device to receive downlink TDOA messages according to certain embodiments of the disclosure. Operations 1000 to 1045 of FIG. 10 may be performed by a processor (e.g., the processor 120 of FIG. 1) and a communication module (e.g., a UWB communication module) included in an electronic device (e.g., the electronic device 101 of FIG. 1). In certain embodiments, at least one of the illustrated operations may be changed, omitted, or reordered.

Referring to FIG. 10, in operation 1000, the processor 120 of the electronic device 101 may set and operate (e.g., activate) the UWB communication module in a wake-up state. In an embodiment, the processor 120 may wake up the UWB communication module in response to the user's request for UWB communication or detecting execution of an application using UWB communication. For example, the processor 120 may first wake up the UWB communication module when the user starts the map application to use the downlink TDOA. As another example, UWB communication may be used in applications requiring precise positioning, short-range communication for providing a short-range service, and/or automatic lock/unlock service for car key or door lock based on the user's location. According to certain embodiments, the processor 120 may detect execution of an application requiring communication through the UWB communication module and perform an operation (e.g., activation of the UWB communication module) related thereto.

According to an embodiment, the processor 120 may receive scheduling information for UWB communication and/or a trigger command for UWB communication from an external electronic device (e.g., a master anchor, an initiator anchor, or another electronic device) through another communication scheme (e.g., at least one of BLE or Wi-Fi). The scheduling information may define a ranging block structure (e.g., the ranging block 300 of FIG. 3) for UWB communication. According to an embodiment, the scheduling information may indicate a ranging block allocated to the electronic device 101 or at least one ranging round in each ranging block allocated to the electronic device 101. The electronic device 101 may start performing operation 1000 within every ranging round of the allocated ranging block, the allocated ranging round within each ranging block, or the allocated ranging round within the allocated ranging block.

In operation 1005, the processor 120 may monitor whether a RIM, a given number of (e.g., two or more in the case of two-dimensional (2D) positioning or three or more in the case of three-dimensional (3D) positioning. Hereinafter, described as being two) RRMs, and an RFM in each of a given number of (e.g., the number of ranging rounds belonging to one ranging block) ranging rounds for UWB communication. In one embodiment, the processor 120 may determine whether the RIM, the given number of RRMs, and the RFM are successfully received in the given number of ranging rounds. In an embodiment, the given number of ranging rounds may belong to the same ranging block or different ranging blocks.

According to an embodiment, by receiving a RIM transmitted from the initiator anchor after switching the UWB communication module to the wake-up state, the processor 120 may identify that the first ranging round (e.g., ranging round 2 in ranging block 1) is initiated, monitor reception of downlink TDOA messages responsive to the RIM in the ranging slots in the first ranging round, and determine whether the given number of RRMs and related RFM responsive to the RIM are successfully received in the ranging slots as a result of monitoring. Upon failing to successfully receive the RIM, RRMs, and RFM in the subsequent ranging round(s) after successfully receiving the RIM, the given number of RRMs, and RFM in the first ranging round, e.g., if any one of the RIM, RRMs, or RFM is not received in the next ranging round, the processor 120 may maintain the UWB communication module in the wake-up state and return to operation 1000.

According to an embodiment, operation 1005 may include operations 810 to 835 of FIG. 8. For example, the processor 120 may wake up to monitor reception of a RIM in the RIM slot of each ranging round (operation 810) and, if no RIM is received, set the UWB communication module to the sleep state up to the RIM slot of the next ranging round. Upon receiving a RIM in the RIM slot, the processor 120 may monitor reception of RRMs in the subsequent RRM slots (operation 815) and, if a given number of RRMs are not received, set the UWB communication module to the sleep state up to the RIM slot of the next ranging round (operation 830). Upon receiving RRMs in the RRM slots, the processor 120 may monitor reception of the RFM in the subsequent RFM slot (operation 820) and, if no RFM is received, set the UWB communication module to the sleep state up to the RIM slot of the next ranging round (operations 830 and 835). In contrast, if an RFM is successfully received, the processor 120 may calculate the position of the electronic device 101 (operation 825) and operate in the sleep state (operations 830 and 835) until the RIM slot of the next round is reached.

In operation 1010, the processor 120 may determine whether the number of reception successes indicating the number of ranging rounds in which the RIM, the given number of RRMs, and the RFM are identified as successfully received through operation 1005 reaches a given threshold TH1 (e.g., an integer equal to or larger than 1). If the number of reception successes is not larger than TH1, the processor 120 may return to operation 1005. If the number of reception successes is larger than TH1, the processor 120 may proceed to operation 1015. For example, if the number of reception successes in the designated number of rounds (e.g., a multiple of the number of ranging rounds belonging to one ranging block) is smaller than TH1, the processor 120 may deactivate at least part of the UWB communication module or terminate the operations of FIG. 10.

According to an embodiment, successful reception of the RIM, RRMs, and RFM in each ranging round may include, e.g., as illustrated in FIG. 5, the operation of receiving the RIM transmitted from the initiator anchor in a designated RIM slot (e.g., ranging slot 304) in the corresponding ranging round, the operation of receiving RRMs respectively transmitted from different responder anchors in response to the RIM in the RRM slots (e.g., the ranging slots 306 and 308) in the first ranging round, and the operation of receiving the RFM transmitted from the initiator anchor in a designated RFM slot (e.g., ranging slot 310) in the first ranging round. In one embodiment, the processor 120 may receive RIMs from the same or different initiator anchors in the given number of ranging rounds.

In operation 1015, the processor 120 may perform a round selection operation for selecting a ranging round to wake up from among subsequent ranging rounds. In an embodiment, when the processor 120 successfully receives the RIM, RRMs and RFM in the ranging rounds, the processor 120 may determine that it is not necessary to keep waking up in every ranging round, and may wake up only in the RIM slot in the selected ranging round in each ranging block and, in the remaining ranging rounds, perform the round selection operation to set the UWB communication module to the sleep state. For example, there may be one or more ranging rounds in which RIM, RRMs, and RFM are successfully received, and the processor 120 selects a designated number of (e.g., at least one) ranging rounds from among the ranging rounds. For example, when there is one ranging round in which RIM, RRMs, and RFM are successfully received, the processor 120 may select the ranging round.

In an embodiment, upon identifying that the number of reception successes is larger than the threshold, the processor 120 may switch the UWB communication module to the sleep state in operation 1020 and may perform the round selection operation in operation 1015 later or substantially simultaneously. Switching the UWB communication module to the sleep state may include deactivating the entire UWB communication module or deactivating at least part of the UWB communication module.

In an embodiment, the round selection operation may include the operation of selecting at least one ranging round (e.g., one) in which the UWB communication module is to wake up within one ranging block. In an embodiment, the round selection operation may include the operation of selecting at least one ranging round in which the UWB communication module is to wake up in each subsequent ranging block based on information (e.g., number, positions, and/or received signal strengths) for the anchor devices which have transmitted the RIM, RRMs, and RFM and the round indexes of the plurality of ranging rounds in which the RIM, RRMs, and RFM are successfully received.

As an embodiment of the round selection operation, the processor 120 may select a ranging round in which the number of anchor devices located within a field of view (FOV) (hereinafter referred to as FOV anchors) is greater. In an embodiment, the FOV anchors may be defined as including the initiator anchor that has transmitted the RIM and RFM received by the electronic device 101 in each ranging round and responder anchors that have transmitted the RRMs received by the electronic device 101. In an embodiment, when the electronic device 101 is located in the cell 402 of FIG. 4, the master anchor 402a may be an initiator anchor, and the slave anchors in the cell 402 may be responder anchors.

In an embodiment, from among the plurality of ranging rounds in which the RIM, RRMs and RFM are successfully received, the round index of at least one ranging round in which the largest number of FOV anchors are present may be selected.

As an embodiment of the round selection operation, the processor 120 may select a ranging round in which the anchor center position for FOV anchors is closer to the electronic device 101. In an embodiment, the anchor center position may be represented as a position having average coordinates calculated based on the positions of the anchor devices that have transmitted the RIM, RRMs, and RFM received by the electronic device 101. The processor 120 may calculate the anchor center position of the anchor devices for each of the plurality of ranging rounds in which the RIM, RRMs, and RFM are successfully received, based on previously known position information for the anchor devices and select the round index of at least one ranging round corresponding to at least one anchor center position closest to the electronic device 101 among the anchor center positions corresponding to the plurality of ranging rounds. In an embodiment, the processor 120 may set the position of the initiator anchor as the anchor center position and may select the ranging round including the initiator anchor closest to the electronic device 101.

In operation 1020, the processor 120 may switch the UWB communication module to the sleep state and may maintain the UWB communication module in the sleep state until the ranging round (i.e., referred to as a selected ranging round) having the selected round index in the next ranging block is reached.

In operation 1025, the processor 120 may determine whether the RIM slot allocated within the selected ranging round has been reached. In an embodiment, the selected ranging round may be a ranging round having the round index of the ranging round selected in operation 1015 within the next ranging block. If the RIM slot of the selected ranging round is not reached, the processor 120 may return to operation 1020 and maintain the UWB communication module in the sleep state. In contrast, if the RIM slot of the selected ranging round is reached, the processor 120 may proceed to operation 1030.

For example, if reception of the RIM, RRMs, and RFM in three ranging rounds (e.g., ranging rounds 2, 7, and 9) in ranging blocks 1 to 3 succeeds, one ranging round (e.g., ranging round 7) may be selected from among the three ranging rounds, and the processor 120 may maintain the UWB communication module in the sleep state until before the RIM slot of ranging round 7 in ranging block 2 is reached and, in the RIM slot of ranging round 7 in ranging block 2, wake up the UWB communication module. As another example, two ranging rounds 2 and 7 may be selected from among the three ranging rounds, and the processor 120 may wake up the UWB communication module in the RIM slot of ranging round 2 in ranging block 2 and, if reception of the RIM fails, set the UWB communication module to the sleep state until before the UWB communication module wakes up in the RIM slot of ranging round 7. As another example, if reception of the RIM, RRMs, and RFM succeeds in ranging rounds 7 and 9 in ranging block 1 and ranging rounds 0 and 1 in ranging block 2, two ranging rounds (e.g., ranging rounds 7 and 1) may be selected from among the four ranging rounds, and the processor 120 may wake up the UWB communication module in the RIM slot in ranging round 1 in ranging block 3 and the RIM slot of ranging round 7 in ranging block 2.

In operation 1030, the processor 120 may switch the UWB communication module to the wake-up state in the RIM slot of the selected ranging round. In operation 1035, the processor 120 may determine whether the RIM, RRMs, and RFM are successfully received within the selected ranging round. If the RIM, RRMs, and RFM are successfully received within the selected ranging round, the processor 120 may return to operation 1020 to operate in the sleep state until before the RIM slot of the next selected round is reached.

If the RIM, RRMs and RFM are not successfully received within the selected ranging round, in operation 1040, the processor 120 may count the number of reception failures and determine whether the number of reception failures exceeds a threshold TH2. For example, when the RIM, RRMs, and RFM are not successfully received within one selected ranging round, the processor 120 may increase the number of reception failures by one. As another example, when the RIM, RRMs, and RFM are not successfully received in at least one of the two or more selected ranging rounds, the processor 120 may increase the number of reception failures. As another example, when the RIM, RRMs, and RFM are not successfully received in all of the selected two or more ranging rounds, the processor 120 may increase the number of reception failures by one.

In operation 1040, the processor 120 may determine whether the number of reception failures for the selected ranging round in the plurality of ranging blocks exceeds a given threshold TH. If the number of reception failures does not exceed the threshold, the processor 120 may proceed to operation 1045 to determine whether to re-perform the round selection operation. In an embodiment, operation 1045 may be omitted. If the number of reception failures does not exceed the threshold, the processor 120 may switch to the sleep state and proceed to operation 1020 to monitor the next selected round. If the number of reception failures exceeds the threshold, the processor 120 may initialize the number of reception failures and proceed to operation 1005. In other words, if the number of reception failures exceeds the threshold, the processor 120 may determine that the round selection operation needs to be performed again and may perform operation 1005 to monitor a given number of ranging rounds.

According to an embodiment, operation 1035 may include operations 810 to 835 of FIG. 8. In this case, if no RIM is received in the RIM slot of the selected ranging round, the processor 120 may perform operation 1040 to count the number of reception failures and proceed to operation 1020 to switch the UWB communication module to the sleep state. In an embodiment, if a RIM is received in the RIM slot of the selected ranging round, the processor 120 may monitor the allocated RRM slots while maintaining the UWB communication module in the wake-up state. If a given number of RRMs are not received in the allocated RRM slots, the processor 120 may perform operation 1040 to count the number of reception failures and proceed to operation 1020 to switch the UWB communication module to the sleep state.

In one embodiment, if the RIM is received in the RIM slot of the selected ranging round, and the given number of RRMs are received in the allocated RRM slots, the processor 120 may monitor the allocated RFM slot while maintaining the UWB communication module in the wake-up state. If no RFM is received in the allocated RFM slot, the processor 120 may perform operation 1040 to count the number of reception failures and proceed to operation 1020 to switch the UWB communication module to the sleep state.

In operation 1045, the processor 120 may determine whether it is necessary to re-perform the round selection operation. In an embodiment, the processor 120 may determine whether it is necessary to change the selected ranging round. In an embodiment, the processor 120 may determine that it is necessary to perform the round selection operation when the number of FOV anchors in the selected ranging round is changed as compared to, e.g., a previous ranging block, and maintain the wake-up state and proceed to operation 1000. In an embodiment, when the distance between the anchor center position of the FOV anchors and the electronic device 101 in the selected ranging round exceeds a given threshold, the processor 120 may determine that it is necessary to re-perform the round selection operation and proceed to operation 1005.

If it is not determined in operation 1045 that the round selection operation needs to be performed, the processor 120 may return to operation 1020 to switch the UWB communication module to the sleep state and maintain the sleep state up to the RIM slot of the next selected ranging round.

In an embodiment, the processor 120 may terminate UWB communication and turn off the UWB communication module when reception of the RIM, RRMs, and RFM fails in all selected ranging rounds.

Although not shown, the operations of FIG. 10 may be repeatedly performed, as an example, until an application using UWB communication in the electronic device 101 is terminated or is determined to be terminated by the processor 120.

Figure 11:
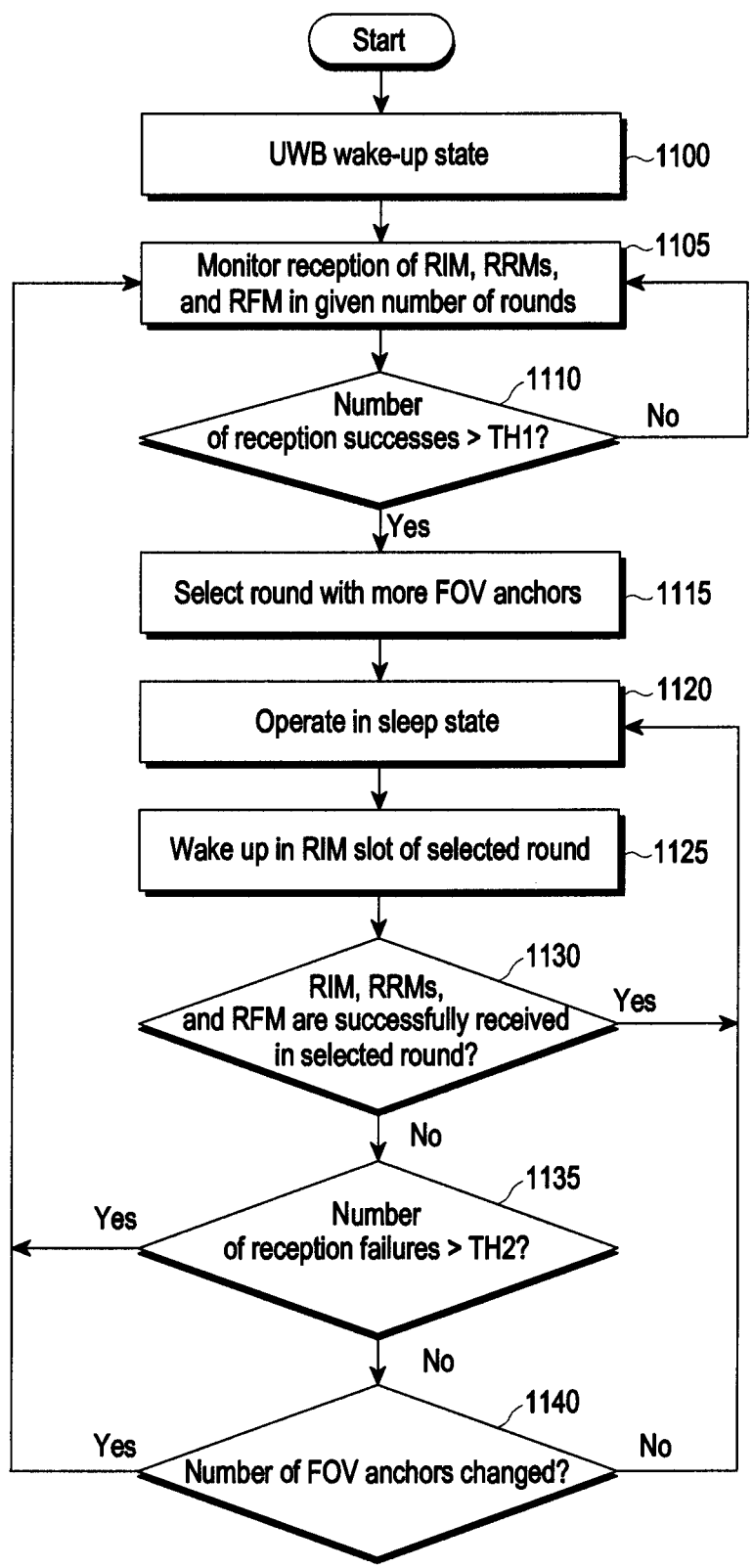
FIG. 11 is a flowchart illustrating an operation in which an electronic device selects a ranging round according to the number of FOV anchors according to certain embodiments of the disclosure.

FIG. 11 is a flowchart illustrating an operation in which an electronic device selects a ranging round according to the number of FOV anchors according to certain embodiments of the disclosure. Operations 1105 to 1140 of FIG. 11 may be performed by a processor (e.g., the processor 120 of FIG. 1) and a communication module (e.g., a UWB communication module) included in an electronic device (e.g., the electronic device 101 of FIG. 1). In one embodiment, the operations of FIG. 11 may be one implementation example of the flowchart illustrated in FIG. 10. In certain embodiments, at least one of the illustrated operations may be changed, omitted, or reordered.

Referring to FIG. 11, in operation 1100, the processor 120 of the electronic device 101 may operate (e.g., activate) the UWB communication module in a wake-up state. In operation 1105, the processor 120 may monitor whether a RIM, a given number of (e.g., two or more in the case of two-dimensional (2D) positioning or three or more in the case of three-dimensional (3D) positioning. Hereinafter, described as being two) RRMs, and an RFM in each of a given number of (e.g., the number of ranging rounds belonging to one ranging block) ranging rounds for UWB communication. In operation 1110, the processor 120 may determine whether the number of reception successes indicating the number of ranging rounds in which the RIM, RRMs, and RFMs are successfully received among the given number of ranging rounds is greater than the threshold TH1. If the number of reception successes is not larger than TH1, the processor 120 may return to operation 1105. If the number of reception successes is larger than TH1, the processor 120 may proceed to operation 1115.

According to an embodiment, operation 1105 may include operations 810 to 835 of FIG. 8. For example, the processor 120 may wake up to monitor reception of a RIM in the RIM slot of each ranging round (operation 810) and, if no RIM is received, set the UWB communication module to the sleep state up to the RIM slot of the next ranging round. Upon receiving a RIM in the RIM slot, the processor 120 may monitor reception of RRMs in the subsequent RRM slots (operation 815) and, if a given number of RRMs are not received, set the UWB communication module to the sleep state up to the RIM slot of the next ranging round. Upon receiving RRMs in the RRM slots, the processor 120 may monitor reception of the RFM in the subsequent RFM slot (operation 820) and, if no RFM is received, set the UWB communication module to the sleep state up to the RIM slot of the next ranging round.

In an embodiment, the processor 120 may store information (e.g., round index) of the ranging round in which the RIM, RRMs, and RFM are successfully received every ranging round. For example, if reception of the RIM, RRMs, and RFM succeeds in three ranging rounds (e.g., ranging rounds 2, 7, and 9) in the ranging block 1 is successful, the processor 120 may determine to proceed to operation 1115. For example, if reception of the RIM, RRMs, and RFM succeeds in two ranging rounds 7 and 9 in ranging block 1 and ranging rounds 2 and 3 in ranging block 2, the processor 120 may determine to proceed to operation 1115.

In operation 1115, the processor 120 may select the round index of at least one ranging round in which the number of FOV anchors is greater among the ranging rounds in which reception of the RIM, RRMs, and RFM is successful. In an embodiment, the FOV anchors may be defined as the initiator anchor that has transmitted the RIM and RFM received by the electronic device 101 in each ranging round and responder anchors that have transmitted the RRMs received by the electronic device 101. In an embodiment, the processor 120 may store, as FOV anchors of the ranging round, information (e.g., anchor identifier) for the initiator anchor that has transmitted the RIM and the RFM and information (e.g., anchor identifier) for the responder anchors that have transmitted the RRMs whenever reception of the RIM, RRMs, and RFM succeeds in the ranging round. The initiator anchors and responder anchors in each ranging round may be different or identical in whole or part from/to those in other ranging rounds. If reception of the RIM, RRMs, and RFM succeeds in a plurality of ranging rounds (e.g., ranging rounds 2, 7, and 9), the processor 120 may identify the number of FOV anchors for each of the ranging rounds and select at least one ranging round (e.g., ranging round 2 or ranging rounds 2 and 7) having the largest number of FOV anchors based on the number of FOV anchors.

In operation 1120, the processor 120 may switch the UWB communication module to the sleep state and may maintain the UWB communication module in the sleep state until the ranging round (i.e., referred to as a selected ranging round) having the selected round index in the next ranging block is reached.

In operation 1125, the processor 120 may switch the UWB communication module to the wake-up state in the RIM slot of the selected ranging round. In operation 1130, the processor 120 may determine whether the RIM, RRMs, and RFM are successfully received within the selected ranging round. If the RIM, RRMs, and RFM are not successfully received within the selected ranging round, the processor 120 may count the number of reception failures. In operation 1135, the processor 120 may determine whether the number of reception failures for the selected ranging round in the plurality of ranging blocks exceeds a given threshold TH2. If the number of reception failures does not exceed the threshold, the processor 120 may proceed to operation 1140 to determine whether to re-perform the round selection operation. In an embodiment, operation 1140 may be omitted. If the number of reception failures does not exceed the threshold, the processor 120 may switch to the sleep state and proceed to operation 1120 to monitor the next selected round. If the number of reception failures exceeds the threshold, the processor 120 may initialize the number of reception failures and proceed to operation 1105.

According to an embodiment, operation 1135 may include operations 810 to 835 of FIG. 8.

In operation 1140, the processor 120 may determine whether the number of FOV anchors has changed in the selected ranging round as compared to, e.g., a previous ranging block. For example, when the position of the electronic device 101 is changed or the positions of anchors are changed (e.g., added, deleted, or moved), the number of FOV anchors may be changed. When the number of FOV anchors is changed as compared to the previous ranging block or is changed by a predetermined value or more, the processor 120 may proceed to operation 1105 to re-perform the round selection operation. In contrast, if the number of FOV anchors in the selected ranging round is not changed as compared with the previous ranging block, the processor 120 may return to operation 1120 to switch the UWB communication module to the sleep state and maintain the sleep state up to the RIM slot of the next selected ranging round.

Although not shown, the operations of FIG. 11 may be repeatedly performed, as an example, until an application using UWB communication in the electronic device 101 is terminated or is determined to be terminated by the processor 120.

Figure 12:
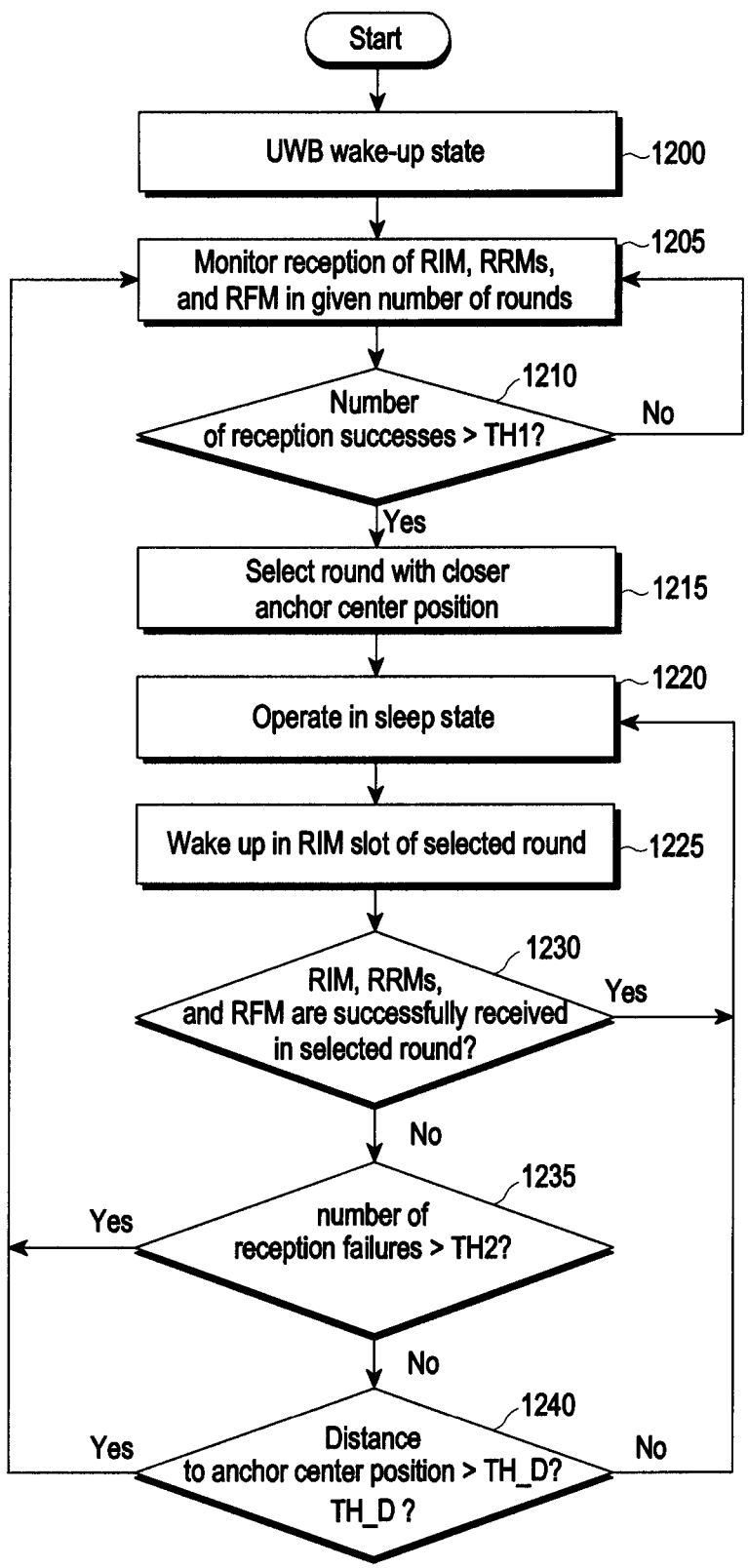
FIG. 12 is a flowchart illustrating an operation in which an electronic device selects a ranging round according to an anchor center position according to certain embodiments of the disclosure.

FIG. 12 is a flowchart illustrating an operation in which an electronic device selects a ranging round according to an anchor center position according to certain embodiments of the disclosure. Operations 1205 to 1240 of FIG. 12 may be performed by a processor (e.g., the processor 120 of FIG. 1) and a communication module (e.g., a UWB communication module) included in an electronic device (e.g., the electronic device 101 of FIG. 1). In one embodiment, the operations of FIG. 12 may be one implementation example of the flowchart illustrated in FIG. 10. In certain embodiments, at least one of the illustrated operations may be changed, omitted, or reordered.

Referring to FIG. 12, in operation 1200, the processor 120 of the electronic device 101 may operate (e.g., activate) the UWB communication module in a wake-up state. In operation 1205, the processor 120 may determine whether a RIM, a given number of (e.g., two or more in the case of two-dimensional (2D) positioning or three or more in the case of three-dimensional (3D) positioning. Hereinafter, described as being two) RRMs, and an RFM in each of a given number of (e.g., the number of ranging rounds belonging to one ranging block) ranging rounds for UWB communication. In operation 1210, the processor 120 may determine whether the number of reception successes indicating the number of ranging rounds in which the RIM, RRMs, and RFMs are successfully received among the given number of ranging rounds is greater than the threshold TH1. If the number of reception successes is not larger than TH1, the processor 120 may return to operation 1205.

According to an embodiment, operation 1205 may include operations 810 to 835 of FIG. 8. For example, the processor 120 may wake up to monitor reception of a RIM in the RIM slot of each ranging round (operation 810) and, if no RIM is received, set the UWB communication module to the sleep state up to the RIM slot of the next ranging round. Upon receiving a RIM in the RIM slot, the processor 120 may monitor reception of RRMs in the subsequent RRM slots (operation 815) and, if a given number of RRMs are not received, set the UWB communication module to the sleep state up to the RIM slot of the next ranging round. Upon receiving RRMs in the RRM slots, the processor 120 may monitor reception of the RFM in the subsequent RFM slot (operation 820) and, if no RFM is received, set the UWB communication module to the sleep state up to the RIM slot of the next ranging round. In contrast, if the number of reception successes is larger than TH1, the processor 120 may proceed to operation 1215.

In an embodiment, the processor 120 may store information (e.g., round index) of the ranging round in which the RIM, RRMs, and RFM are successfully received every ranging round. For example, if reception of the RIM, RRMs, and RFM succeeds in three ranging rounds (e.g., ranging rounds 2, 7, and 9) in the ranging block 1 is successful, the processor 120 may determine to proceed to operation 1215. For example, if reception of the RIM, RRMs, and RFM succeeds in two ranging rounds 7 and 9 in ranging block 1 and ranging rounds 2 and 3 in ranging block 2, the processor 120 may determine to proceed to operation 1215.

In operation 1215, the processor 120 may select the round index of at least one ranging round in which the anchor center position of FOV anchors is closer to the electronic device 101 among the ranging rounds in which reception of the RIM, RRMs, and RFM is successful. In an embodiment, the anchor center position may be calculated as average coordinates arithmetically calculated based on the positions of anchor devices that have transmitted the RIM, RRMs, and RFM received by the electronic device 101. In an embodiment, the anchor center position may be the center of gravity of the area formed by the positions of the anchor devices that have transmitted the RIM, RRMs, and RFM. In an embodiment, the anchor center position may be calculated as the position of the initiator anchor that has transmitted the RIM and RFM received by the electronic device 101. According to an embodiment, the anchor center position may be calculated based on the signal strength of the RIM, RRMs, and RFM received by the electronic device 101. For example, the electronic device 101 may compare the strengths of the received signals including the RIM, the RFM, and/or the RFM for each anchor device and may determine that the anchor having the larger signal strength has the closer anchor center position.

In operation 1220, the processor 120 may switch the UWB communication module to the sleep state and may maintain the UWB communication module in the sleep state until the ranging round (i.e., referred to as a selected ranging round) having the selected round index in the next ranging block is reached.

In operation 1225, the processor 120 may switch the UWB communication module to the wake-up state in the RIM slot of the selected ranging round. In operation 1230, the processor 120 may determine whether the RIM, RRMs, and RFM are successfully received within the selected ranging round. If the RIM, RRMs, and RFM are not successfully received within the selected ranging round, the processor 120 may count the number of reception failures. In operation 1235, the processor 120 may determine whether the number of reception failures for the selected ranging round in the plurality of ranging blocks exceeds a given threshold TH. If the number of reception failures does not exceed the threshold, the processor 120 may proceed to operation 1240 to determine whether to re-perform the round selection operation. In an embodiment, operation 1240 may be omitted. If the number of reception failures does not exceed the threshold, the processor 120 may switch to the sleep state and proceed to operation 1220 to monitor the next selected round. If the number of reception failures exceeds the threshold, the processor 120 may initialize the number of reception failures and proceed to operation 1205.

According to an embodiment, operation 1235 may include operations 810 to 835 of FIG. 8.

In operation 1240, the processor 120 may determine whether the distance between the anchor center position of the FOV anchors and the electronic device 101 in the selected ranging round exceeds a given threshold TH_D. For example, when the position of the electronic device 101 is changed or the positions of anchors are changed (e.g., added, deleted, or moved), the anchor center position may be changed. If the distance exceeds the threshold TH_D, the processor 120 may proceed to operation 1205 to re-perform the round selection operation. In contrast, if the distance does not exceed the threshold, the processor 120 may return to operation 1220 to switch the UWB communication module to the sleep state and maintain the sleep state up to the RIM slot of the next selected ranging round. According to another embodiment, in operation 1240, the processor 120 may determine whether a change in the strength of the signal including the received RIM and/or RFM exceeds a threshold or more. If the change in signal strength exceeds the threshold, the processor 120 may proceed to operation 1205.

Although not shown, the operations of FIG. 8 may be repeatedly performed, as an example, until an application using UWB communication in the electronic device 101 is terminated or is determined to be terminated by the processor 120.

Figure 13:
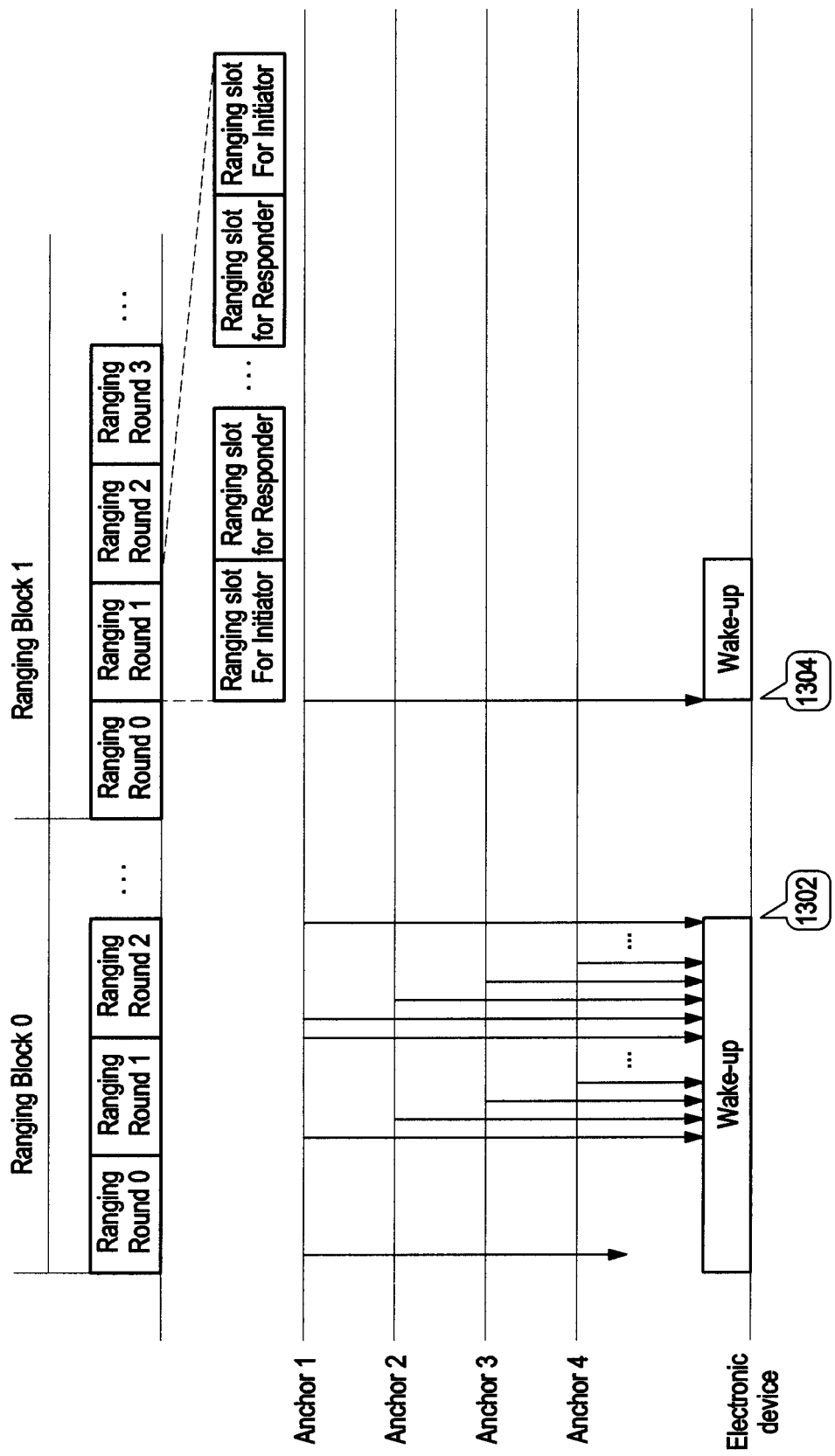
FIG. 13 is a timing diagram for describing an operation in which an electronic device wakes up in a selected ranging round according to an embodiment of the disclosure.

FIG. 13 is a timing diagram for describing an operation in which an electronic device wakes up in a selected ranging round according to an embodiment of the disclosure.

Referring to FIG. 13, the electronic device 101 may wake up the UWB communication module and start monitoring reception of download TDOA messages in ranging round 0 of ranging block 0. In an embodiment, the electronic device 101 may operate according to operations 810 to 835 in each range round of ranging block 0. In other words, the electronic device 101 may wake up in each RIM slot in each ranging round to monitor reception of the RIM and, if succeeding in reception of the RIM, monitor the RRM slots and, if succeeding in reception of the RRMs, monitor the RFM slot. In the other slots, the electronic device 101 may operate in the sleep state.

In ranging round 0, the electronic device 101 may fail to receive the RIM. In an embodiment, the electronic device may sleep after the RIM slot of ranging round 0. The electronic device 101 may succeed in receiving the RIM, RRMs, and RFM in ranging round 1 and may succeed in receiving the RIM, RRMs and RFM in ranging round 2. According to an embodiment, the electronic device 101 may sleep after the RFM slots of ranging round 1 and ranging round 2 and until before the RIM slot of the next ranging round. At time 1302, the electronic device 101 may switch the UWB communication module to the sleep state after ranging round 2. The electronic device 101 may select one ranging round (e.g., ranging round 1) based on the anchor center position of the FOV anchors or the number of FOV anchors in ranging rounds 1 and 2.

In an embodiment, the electronic device 101 may maintain the UWB communication module in the sleep state until the selected ranging round (e.g., ranging round 1) in the ranging block 1 is reached.

When the RIM slot in ranging round 1 of ranging block 1 is reached at time point 1304, the electronic device 101 may switch the UWB communication module to the wake-up state and determine whether the RIM, RRMs, and RFM is successfully received in ranging round 1. In an embodiment, whenever reception of the RIM, RRMs, and RFM succeeds in at least one selected ranging round in each ranging block, the electronic device 101 may determine whether the round selection operation for the next ranging block is necessary or perform the round selection operation for the next ranging block. In an embodiment, whenever reception of the RIM, RRMs, and RFM succeeds in the selected ranging round in a given cycle (e.g., a given number of ranging blocks), the electronic device 101 may determine whether the round selection operation for the next ranging block is necessary or perform the round selection operation for the next ranging block.

Figure 14:
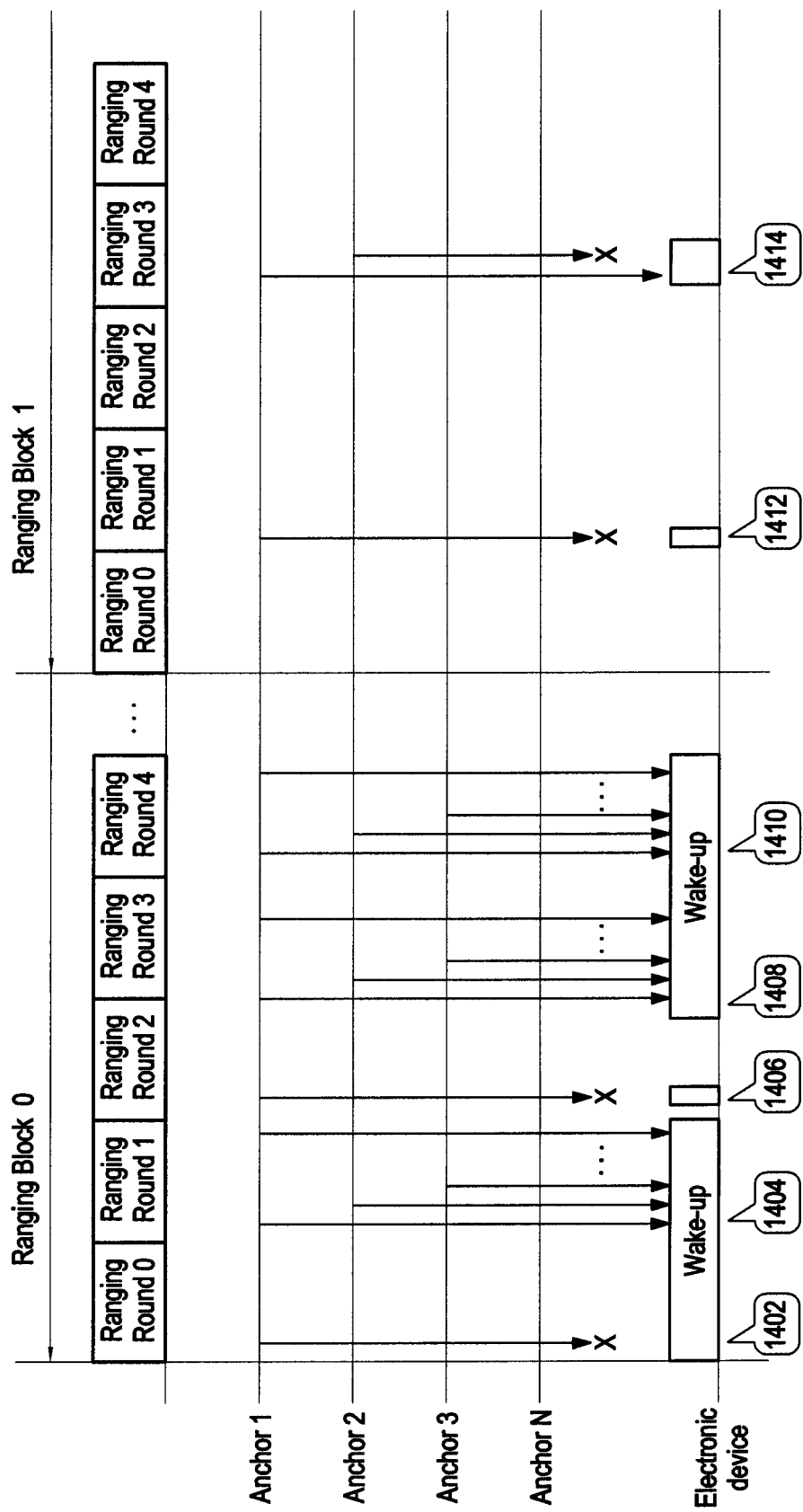
FIG. 14 is a timing diagram for describing an operation in which an electronic device wakes up in a RIM slot and a selected ranging round according to an embodiment of the disclosure.

FIG. 14 is a timing diagram for describing an operation in which an electronic device wakes up in a RIM slot and a selected ranging round according to an embodiment of the disclosure.

Referring to FIG. 14, the electronic device 101 may wake up the UWB communication module and, at time 1402, start monitoring reception of download TDOA messages during ranging round 0 of ranging block 0. In ranging round 0, the electronic device 101 may fail to receive the RIM. In an embodiment, the electronic device 101 may maintain the wake-up state to obtain scheduling information. In an embodiment, when the scheduling information is already stored in the electronic device 101, the electronic device 101 may sleep after the RIM slot of ranging round 0 and until before the RIM slot of ranging round 1.

In ranging round 1 of time 1404, the electronic device 101 may successfully receive the RIM, RRMs, and RFM and, after ranging round 1, switch the UWB communication module to the sleep state. The electronic device 101 may maintain the UWB communication module in the sleep state until before the RIM slot of ranging round 2 based on the scheduling information obtainable through the RIM. In an embodiment, if the electronic device 101 succeeds in reception of the RIM but fails to receive the RRMs or the electronic device 101 succeeds in reception of the RIM and RRMs but fails to receive the RFM in ranging round 1 of time 1404, the electronic device 101 may maintain the UWB communication module in the sleep state. In ranging round 2 of time 1406, the electronic device 101 may fail to receive the RIM and, after sleeping again, wake up the UWB communication module in the RIM slot of ranging round 3.

In ranging round 3 of time 1408 and ranging round 4 of time 1410, the electronic device 101 may succeed in receiving the RIM, RRMs, and RFM. The electronic device 101 may select at least one ranging round (e.g., ranging rounds 1 and 3) based on the anchor center position of the FOV anchors or the number of FOV anchors in ranging rounds 1, 3, and 4 where reception of the RIM, RRMs, and RFM succeeds. According to an embodiment, the electronic device 101 may sleep until before the RIM slot of ranging round 4 after successfully receiving the RFM in ranging round 3.

After ranging round 4 of time 1410, the electronic device 101 may maintain the UWB communication module in the sleep state until the RIM slot of the next selected ranging round (e.g., ranging round 1 of ranging block 1) is reached.

When the RIM slot in ranging round 1 of ranging block 1 is reached at time point 1412, the electronic device 101 may switch the UWB communication module to the wake-up state and determine whether the RIM, RRMs, and RFM is successfully received in ranging round 1. After ranging round 1 of time 1412, the electronic device 101 may maintain the UWB communication module in the sleep state until the RIM slot of the next selected ranging round (e.g., ranging round 3 of the ranging block) is reached. For example, referring to FIG. 14, upon failing to receive the RIM in ranging round 1 of time 1412, the electronic device 101 may switch the UWB communication module to the sleep state. As another example, referring to FIG. 14, upon failing to receive the RRMs in ranging round 3 of time 1414, the electronic device 101 may switch the UWB communication module to the sleep state. In an embodiment, the electronic device 101 may determine whether the round selection operation needs to be re-performed according to operations 1040, 1135, and 1235 and/or operations 1045, 1140, and 1240.

In an embodiment, when reception of the RIM, RRMs, and RFM fails in the selected ranging rounds (e.g., ranging rounds 1 and 3) and the number of reception failures exceeds a threshold TH, the electronic device 101 may perform operation 1045, 1140, or 1240 to determine whether the round selection operation is necessary or perform the round selection operation (e.g., operations 1005 to 1015, operations 1105 to 1115, or operations 1205 to 1215).

Figure 15:
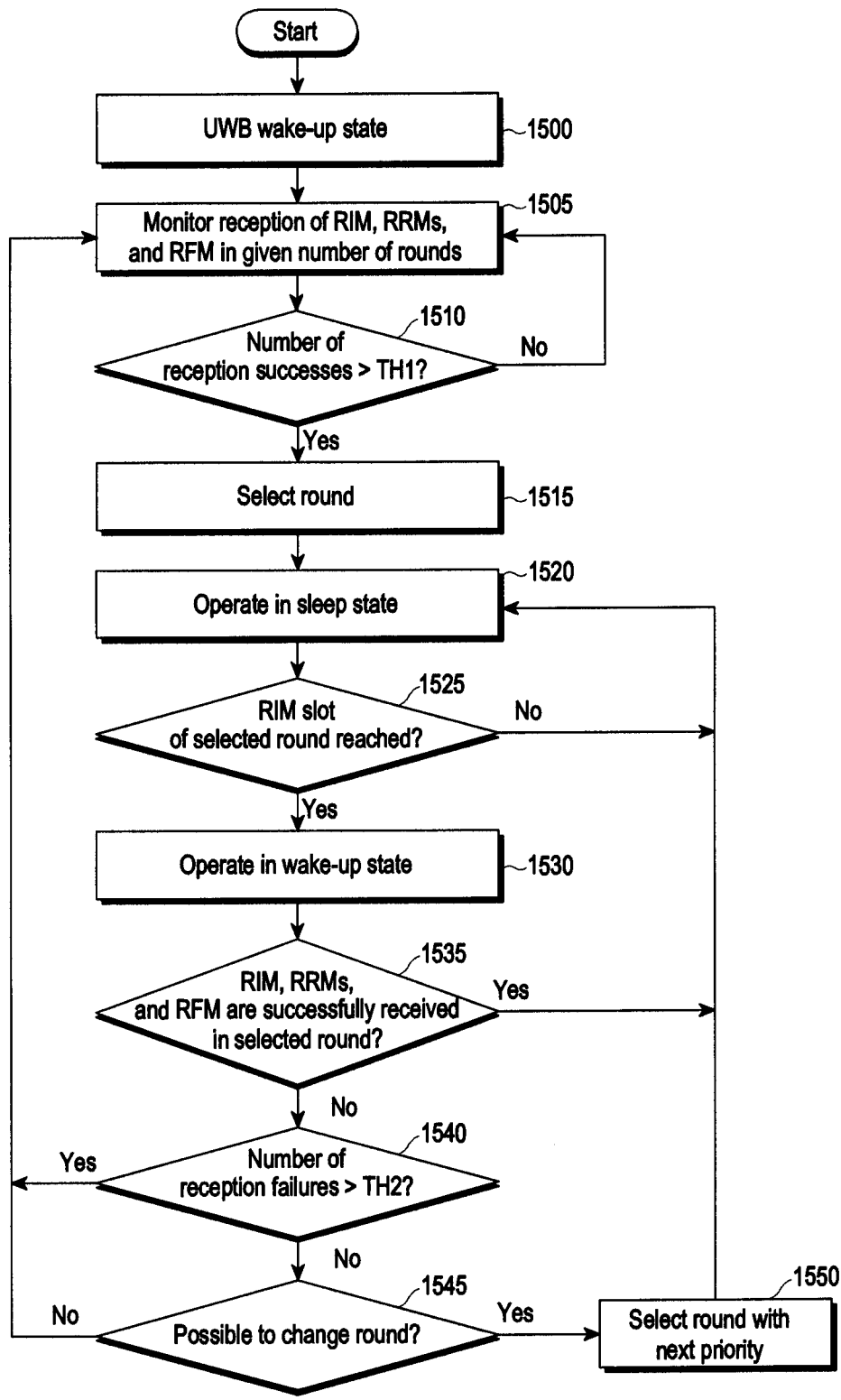
FIG. 15 is a flowchart illustrating an operation for an electronic device to receive downlink TDOA messages according to certain embodiments of the disclosure.

FIG. 15 is a flowchart illustrating an operation for an electronic device to receive downlink TDOA messages according to certain embodiments of the disclosure. Operations 1500 to 1550 of FIG. 15 may be performed by a processor (e.g., the processor 120 of FIG. 1) and a communication module (e.g., a UWB communication module) included in an electronic device (e.g., the electronic device 101 of FIG. 1). In certain embodiments, at least one of the illustrated operations may be changed, omitted, or reordered.

Referring to FIG. 15, in operation 1500, the processor 120 of the electronic device 101 may set the UWB communication module to the wake-up state and operate (e.g., activate) the UWB communication module. In operation 1505, the processor 120 may monitor whether a RIM, a given number of RRMs, and an RFM in each of a given number of (e.g., the number of ranging rounds belonging to one ranging block) ranging rounds for UWB communication. According to an embodiment, operation 1505 may include operations 810 to 835 of FIG. 8.

In operation 1510, the processor 120 may determine whether the number of reception successes indicating the number of ranging rounds in which the RIM, the given number of RRMs, and the RFM are identified as successfully received through operation 1005 reaches a given threshold TH1. If the number of reception successes is not larger than TH1, the processor 120 may return to operation 1505. If the number of reception successes is larger than TH1, the processor 120 may proceed to operation 1515.

In operation 1515, the processor 120 may perform a round selection operation for selecting a ranging round to wake up from among subsequent ranging rounds. In an embodiment, the round selection operation may include the operation of selecting at least one ranging round in which the UWB communication module is to wake up in each subsequent ranging block based on information (e.g., number, positions, and/or received signal strengths) for the anchor devices which have transmitted the RIM, RRMs, and RFM and the round indexes of the plurality of ranging rounds in which the RIM, RRMs, and RFM are successfully received.

In operation 1520, the processor 120 may switch the UWB communication module to the sleep state and may maintain the UWB communication module in the sleep state until the ranging round (i.e., referred to as a selected ranging round) having the selected round index in the next ranging block is reached. In operation 1525, the processor 120 may determine whether the RIM slot allocated within the selected ranging round has been reached. If the RIM slot of the selected ranging round is reached, the processor 120 may proceed to operation 1530.

In operation 1530, the processor 120 may switch the UWB communication module to the wake-up state in the RIM slot of the selected ranging round. In operation 1535, the processor 120 may determine whether the RIM, RRMs, and RFM are successfully received within the selected ranging round. If the RIM, RRMs, and RFM are successfully received within the selected ranging round, the processor 120 may return to operation 1520 to operate in the sleep state until before the RIM slot of the next selected round is reached. According to an embodiment, the processor 120 may calculate the position of the electronic device 101 before operating in the sleep state, after operating in the sleep state, or substantially simultaneously.

If the RIM, RRMs and RFM are not successfully received within the selected ranging round, in operation 1540, the processor 120 may count the number of reception failures and determine whether the number of reception failures exceeds a threshold TH2. If the number of reception failures does not exceed the threshold, the processor 120 may proceed to operation 1545 to determine whether it is possible to change the round. When it is determined that it is possible to change the round, the processor 120 may select a ranging round of the next priority in operation 1550.

In an embodiment, in operation 1550, the processor 120 may select another ranging round that is not selected in operation 1515 from among a plurality of ranging rounds in which the RIM, RRMs, and RFMs are successfully received, identified in operation 1505.

In an embodiment, the plurality of ranging rounds where the RIM, RRMs and RFM are successfully received, identified in operation 1505, may be prioritized according to a predetermined criterion (e.g., at least one of the number of FOV anchors, the distance to the electronic device 101 or the received signal strength). In operation 1515, one ranging round having the highest priority among the prioritized ranging rounds may be selected. In operation 1550, the ranging round having the next priority may be selected.

In an embodiment, in operation 1545, the processor 120 may determine whether there is at least one remaining ranging round not selected in operation 1515 among the plurality of ranging rounds in which the RIM, RRMs, and RFMs are successfully received, identified in operation 1505. If the at least one remaining ranging round exists, in operation 1550, the processor 120 may select the ranging round having the highest priority among the remaining at least one ranging round and proceed to operation 1520.

According to certain embodiments of the disclosure, an electronic device 101 comprises a wireless communication module 192 configured to support ultra-wide band (UWB) communication and at least one processor 120 operatively connected with the wireless communication module, wherein the at least one processor is configured to set the wireless communication module to a wake-up state; when a given number of first ranging response messages (RRMs) are received from second external electronic devices after receiving a first ranging initiation message (RIM) from a first external electronic device in a RIM slot of a first ranging round, set the wireless communication module to a sleep state after receiving a first ranging final message (RFM) from the first external electronic device in a RFM slot of the first ranging round until a RIM slot of a second ranging round is reached after the first ranging round, set the wireless communication module to the wake-up state in a RIM slot in the second ranging round, and set the wireless communication module to the sleep state if a second RIM is not received from a third external electronic device in the RIM slot in the second ranging round.

In an embodiment, when the given number of first RRMs are not received in RRM slots of the first ranging round after receiving the first RIM, the at least one processor may be configured to set the wireless communication module to the sleep state after the RRM slots until a time before the RIM slot in the second ranging round.

In an embodiment, the at least one processor may be configured to when the second RIM is received in the RIM slot of the second ranging round, determine, through the wireless communication module set to the wake-up state, whether a given number of second RRMs are received in RRM slots in the second ranging round, set the wireless communication module to the sleep state if the given number of second RRMs are not received in the RRM slots in the second ranging round, and set the wireless communication module to the wake-up state in a RIM slot of a third ranging round after the second ranging round.

In an embodiment, the at least one processor may be configured to determine, through the wireless communication module, whether a second RFM is received in an RFM slot of the second ranging round while maintaining the wireless communication module in the wake-up state if the given number of second RRMs are received in the RRM slots in the second ranging round.

In an embodiment, the at least one processor may be configured to set the wireless communication module to the sleep state until before the RIM slot of the third ranging round is reached after the second ranging round if the second RFM is received in the RFM slot of the second ranging round.

According to certain embodiments of the disclosure, an electronic device 101 comprises a wireless communication module 192 configured to support ultra-wide band (UWB) communication and at least one processor 120 operatively connected with the wireless communication module, wherein the at least one processor may be configured to set the wireless communication module to a wake-up state, receive, through the wireless communication module, a first ranging initiation message (RIM), at least two first ranging response messages (RRMs) responsive to the first RIM, and a first ranging final message (RFM) in each of a given number of first ranging rounds, select at least one second ranging round for waking up the wireless communication module based on information for anchor devices that have transmitted the first RIM, the first RRMs, and the first RFM in the first ranging rounds, set the wireless communication module to a sleep state until before a RIM slot of the selected second ranging round is reached in response to selecting, set the wireless communication module to the wake-up state in the RIM slot in the selected second ranging round, and determine, through the wireless communication module, whether a second RIM, at least two second RRMs, and a second RFM are received in the selected second ranging round.

In an embodiment, the at least one processor may be configured to identify a number of anchor devices that have transmitted the first RIM, the first RRMs, and the first RFM in each of the first ranging rounds, select a round index of at least one ranging round having a largest number of the anchor devices from among the first ranging rounds, and determine the second ranging round having the selected round index in a next ranging block.

In an embodiment, the at least one processor may be configured to identify a number of anchor devices that have transmitted the second RIM, the at least two RRMs, and the second RFM in the second ranging round if the second RIM, the at least two RRMs, and the second RFM are successfully received in the second ranging round, determine whether the identified number has been changed as compared with a previous ranging block, and determine, through the wireless communication module, whether a third RIM, at least two third RRMs responsive to the third RIM, and a third RFM are received in each of a given number of third ranging rounds if the identified number has been changed as compared with the previous ranging block.

In an embodiment, the at least one processor may be configured to select a round index of each of at least one first ranging round in which an anchor center position representing average coordinates of anchor devices that have transmitted the first RIM, the first RRMs, and the first RRM is closer to the electronic device among the first ranging rounds and determine the second ranging round having the selected round index in a next ranging block.

In an embodiment, the at least one processor may be configured to determine whether a distance between the electronic device and an anchor center position representing average coordinates of anchor devices that have transmitted the second RIM, the at least two second RRMs, and the second RFM in the second ranging round exceeds a threshold if the second RIM, the at least two RRMs, and the second RFM are successfully received in the second ranging round and determine, through the wireless communication module, whether a third RIM, at least two third RRMs responsive to the third RIM, and a third RFM are received in each of a given number of third ranging rounds if the distance exceeds the threshold.

According to certain embodiments of the disclosure, a method performed by an electronic device 101 including a wireless communication module supporting ultra-wide band (UWB) communication may comprise setting (805) the wireless communication module to a wake-up state, when a given number of first ranging response messages (RRMs) are received from second external electronic devices after a first ranging initiation message (RIM) from a first external electronic device in a RIM slot of a first ranging round, setting (830) the wireless communication module to a sleep state after receiving a first ranging final message (RFM) from the first external electronic device in a RFM slot of the first ranging round until a RIM slot of a second ranging round is reached after the first ranging round, setting (835) the wireless communication module to the wake-up state in the RIM slot in the second ranging round, and setting (830) the wireless communication module to the sleep state if a second RIM is not received from a third external electronic device in the RIM slot in the second ranging round.

In an embodiment, the method may further comprise when the given number of first RRMs are not received in RRM slots of the first ranging round after receiving the first RIM, setting the wireless communication module to the sleep state after the RRM slots until a time before the RIM slot in the second ranging round.

In an embodiment, the method may further comprise when the second RIM is received in the RIM slot of the second ranging round, determining (815), through the wireless communication module set to the wake-up state, whether a given number of second RRMs are received in RRM slots in the second ranging round, setting (830) the wireless communication module to the sleep state if the given number of second RRMs are not received in the RRM slots in the second ranging round, and setting (835) the wireless communication module to the wake-up state in a RIM slot of a third ranging round after the second ranging round.

In an embodiment, the method may further comprise determining (820), through the wireless communication module, whether a second RFM is received in an RFM slot of the second ranging round while maintaining the wireless communication module in the wake-up state if the given number of second RRMs are received in the RRM slots in the second ranging round.

In an embodiment, the method may further comprise setting (830) the wireless communication module to the sleep state until before the RIM slot of the third ranging round is reached after the second ranging round if the second RFM is received in the RFM slot of the second ranging round.

According to certain embodiments of the disclosure, a method performed by an electronic device 101 including a wireless communication module supporting ultra-wide band (UWB) communication may comprise setting (1005) the wireless communication module to a wake-up state, receiving (1005), through the wireless communication module, a first ranging initiation message (RIM), at least two first ranging response messages (RRMs) responsive to the first RIM, and a first ranging final message (RFM) in each of a given number of first ranging rounds, selecting (1015) a second ranging round for waking up the wireless communication module based on information for anchor devices that have transmitted the first RIM, the first RRMs, and the first RFM in the first ranging rounds, setting (1020) the wireless communication module to a sleep state until before a RIM slot in the selected second ranging round is reached in response to selecting, setting (1030) the wireless communication module to the wake-up state in the RIM slot in the selected second ranging round, and determining (1035), through the wireless communication module, whether a second RIM, at least two second RRMs, and a second RFM are received in the selected ranging round.

In an embodiment, the method may further comprise identifying (1110) a number of anchor devices that have transmitted the first RIM, the first RRMs, and the first RFM in each of the first ranging rounds, selecting (1115) a round index of at least one ranging round having a largest number of the anchor devices from among the first ranging rounds, and determining the second ranging round having the selected round index in a next ranging block.

In an embodiment, the method may further comprise identifying a number of anchor devices that have transmitted the second RIM, the at least two RRMs, and the second RFM in the second ranging round if the second RIM, the at least two RRMs, and the second RFM are successfully received (1130) in the second ranging round, determining (1135) whether the identified number has been changed as compared with a previous ranging block, and determining, through the wireless communication module, whether a third RIM, at least two third RRMs responsive to the third RIM, and a third RFM are received in each of a given number of third ranging rounds if the identified number has been changed as compared with the previous ranging block.

In an embodiment, the method may further comprise selecting (1215) a round index of each of at least one first ranging round in which an anchor center position indicating average coordinates of anchor devices that have transmitted the first RIM, the first RRMs, and the first RRM is closer to the electronic device among the first ranging rounds and determining the second ranging round having the selected round index in a next ranging block.

In an embodiment, the method may further comprise determining (1235) whether a distance between the electronic device and an anchor center position indicating average coordinates of anchor devices that have transmitted the second RIM, the at least two second RRMs, and the second RFM in the second ranging round exceeds a threshold if the second RIM, the at least two RRMs, and the second RFM are successfully received in the second ranging round and determining, through the wireless communication module, whether a third RIM, at least two third RRMs responsive to the third RIM, and a third RFM are received in each of a given number of third ranging rounds if the distance exceeds the threshold.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a wireless communication module configured to support ultra-wide band (UWB) communication; and
at least one processor operatively connected with the wireless communication module, wherein the at least one processor is configured to:
set the wireless communication module to a wake-up state;
when a given number of first ranging response messages (RRMs) are received from second external electronic devices after receiving a first ranging initiation message (RIM) from a first external electronic device in a RIM slot of a first ranging round, set the wireless communication module to a sleep state after receiving a first ranging final message (RFM) from the first external electronic device in a RFM slot of the first ranging round until a RIM slot of a second ranging round is reached after the first ranging round;
set the wireless communication module to the wake-up state in the RIM slot in the second ranging round; and
set the wireless communication module to the sleep state if a second RIM is not received from a third external electronic device in the RIM slot in the second ranging round.

2. The electronic device of claim 1, wherein when the given number of first RRMS are not received in RRM slots of the first ranging round after receiving the first RIM, the at least one processor is configured to set the wireless communication module to the sleep state after the RRM slots until a time before the RIM slot in the second ranging round.

3. The electronic device of claim 1, wherein the at least one processor is configured to:
when the second RIM is received in the RIM slot of the second ranging round, determine, through the wireless communication module set to the wake-up state, whether a given number of second RRMs are received in RRM slots in the second ranging round;
set the wireless communication module to the sleep state if the given number of second RRMs are not received in the RRM slots in the second ranging round; and
set the wireless communication module to the wake-up state in a RIM slot of a third ranging round after the second ranging round.

4. The electronic device of claim 3, wherein the at least one processor is configured to determine, through the wireless communication module, whether a second RFM is received in an RFM slot of the second ranging round while maintaining the wireless communication module in the wake-up state if the given number of second RRMs are received in the RRM slots in the second ranging round.

5. The electronic device of claim 4, wherein the at least one processor is configured to set the wireless communication module to the sleep state until before the RIM slot of the third ranging round is reached after the second ranging round if the second RFM is received in the RFM slot of the second ranging round.

6. An electronic device, comprising:
a wireless communication module configured to support ultra-wide band (UWB) communication; and at least one processor operatively connected with the wireless communication module, wherein the at least one processor is configured to:
set the wireless communication module to a wake-up state;
receive, through the wireless communication module, a first ranging initiation message (RIM), at least two first ranging response messages (RRMs) responsive to the first RIM, and a first ranging final message (RFM) in each of a given number of first ranging rounds;
select at least one second ranging round for waking up the wireless communication module based on information for anchor devices that have transmitted the first RIM, the first RRMs, and the first RFM in the first ranging rounds;
set the wireless communication module to a sleep state until before a RIM slot of the selected second ranging round is reached in response to selecting;
set the wireless communication module to the wake-up state in the RIM slot in the selected second ranging round; and
determine, through the wireless communication module, whether a second RIM, at least two second RRMs, and a second RFM are received in the selected second ranging round.

7. The electronic device of claim 6, wherein the at least one processor is configured to:
identify a number of anchor devices that have transmitted the first RIM, the first RRMs, and the first RFM in each of the first ranging rounds;
select a round index of at least one ranging round having a largest number of the anchor devices from among the first ranging rounds; and
determine the second ranging round having the selected round index in a next ranging block.

8. The electronic device of claim 7, wherein the at least one processor is configured to:
identify a number of anchor devices that have transmitted the second RIM, the at least two RRMs, and the second RFM in the second ranging round if the second RIM, the at least two RRMs, and the second RFM are successfully received in the second ranging round;
determine whether the identified number has been changed as compared with a previous ranging block; and
determine, through the wireless communication module, whether a third RIM, at least two third RRMs responsive to the third RIM, and a third RFM are received in each of a given number of third ranging rounds if the identified number has been changed as compared with the previous ranging block.

9. The electronic device of claim 6, wherein the at least one processor is configured to:
select a round index of each of at least one first ranging round in which an anchor center position representing average coordinates of anchor devices that have transmitted the first RIM, the first RRMs, and the first RRM is closer to the electronic device among the first ranging rounds; and
determine the second ranging round having the selected round index in a next ranging block.

10. The electronic device of claim 9, wherein the at least one processor is configured to:
determine whether a distance between the electronic device and an anchor center position representing average coordinates of anchor devices that have transmitted the second RIM, the at least two second RRMs, and the second RFM in the second ranging round exceeds a threshold if the second RIM, the at least two RRMs, and the second RFM are successfully received in the second ranging round; and
determine, through the wireless communication module, whether a third RIM, at least two third RRMs responsive to the third RIM, and a third RFM are received in each of a given number of third ranging rounds if the distance exceeds the threshold.

11. A method performed by an electronic device including a wireless communication module supporting ultra-wide band (UWB) communication, the method comprising:
setting the wireless communication module to a wake-up state; when a given number of first ranging response messages (RRMs) are received from second external electronic devices after a first ranging initiation message (RIM) from a first external electronic device in a RIM slot of a first ranging round, setting the wireless communication module to a sleep state after receiving a first ranging final message (RFM) from the first external electronic device in a RFM slot of the first ranging round until a RIM slot of a second ranging round is reached after the first ranging round;
setting the wireless communication module to the wake-up state in the RIM slot in the second ranging round; and
setting the wireless communication module to the sleep state if a second RIM is not received from a third external electronic device in the RIM slot in the second ranging round.

12. The method of claim 11, further comprising when the given number of first RRMs are not received in RRM slots of the first ranging round after receiving the first RIM, setting the wireless communication module to the sleep state after the RRM slots until a time before the RIM slot in the second ranging round.

13. The method of claim 11, further comprising:
when the second RIM is received in the RIM slot of the second ranging round, determining, through the wireless communication module set to the wake-up state, whether a given number of second RRMs are received in RRM slots in the second ranging round;
setting the wireless communication module to the sleep state if the given number of second RRMs are not received in the RRM slots in the second ranging round; and
setting the wireless communication module to the wake-up state in a RIM slot of a third ranging round after the second ranging round.

14. A method performed by an electronic device including a wireless communication module supporting ultra-wide band (UWB) communication, the method comprising:
setting the wireless communication module to a wake-up state;
receiving, through the wireless communication module, a first ranging initiation message (RIM), at least two first ranging response messages (RRMs) responsive to the first RIM, and a first ranging final message (RFM) in each of a given number of first ranging rounds;
selecting a second ranging round for waking up the wireless communication module based on information for anchor devices that have transmitted the first RIM, the first RRMs, and the first RFM in the first ranging rounds;
setting the wireless communication module to a sleep state until before a RIM slot in the selected second ranging round is reached in response to selecting;

setting the wireless communication module to the wake-up state in the RIM slot in the selected second ranging round; and determining, through the wireless communication module, whether a second RIM, at least two second RRMs, and a second RFM are received in the selected ranging round.

15. The method of claim 14, further comprising:

identifying a number of anchor devices that have transmitted the first RIM, the first RRMs, and the first RFM in each of the first ranging rounds;

selecting a round index of at least one ranging round having a largest number of the anchor devices from among the first ranging rounds; and determining the second ranging round having the selected round index in a next ranging block.

* * * * *